US010907743B2

(12) United States Patent
Ishizaki et al.

(10) Patent No.: US 10,907,743 B2
(45) Date of Patent: Feb. 2, 2021

(54) CHECK VALVE AND RECIPROCATING BODY FOR CHECK VALVE

(71) Applicant: ISHIZAKI Co., LTD., Tokyo (JP)

(72) Inventors: Nobuyuki Ishizaki, Tokyo (JP); Takeshi Ouchi, Ibarakigun (JP); Daisuke Kikuchi, Ibarakigun (JP); Kazuhiko Kojima, Tokyo (JP); Futoshi Hasegawa, Tokyo (JP); Kohei Mizutani, Tokyo (JP)

(73) Assignee: ISHIZAKI CO., LTD., Tokyo (JP)

( * ) Notice: Subject to any disclaimer, the term of this patent is extended or adjusted under 35 U.S.C. 154(b) by 0 days.

(21) Appl. No.: 16/742,559

(22) Filed: Jan. 14, 2020

(65) Prior Publication Data

US 2020/0149644 A1     May 14, 2020

Related U.S. Application Data

(63) Continuation of application No. PCT/JP2019/009662, filed on Mar. 11, 2019.

(30) Foreign Application Priority Data

Mar. 12, 2018   (JP) .................................. 2018-044510

(51) Int. Cl.
*F16K 15/06*      (2006.01)
*F16K 27/02*      (2006.01)

(52) U.S. Cl.
CPC ........ *F16K 15/063* (2013.01); *F16K 27/0209* (2013.01)

(58) Field of Classification Search
CPC ........ F16K 15/063; F16K 15/06; F16K 1/126; F16K 27/209; Y10T 137/7934
See application file for complete search history.

(56) References Cited

U.S. PATENT DOCUMENTS 666,245 A *   1/1901   Ginaca .................. F16K 15/063
                                                                                       137/543
1,692,795 A    11/1928   Clifford
(Continued)

FOREIGN PATENT DOCUMENTS

CN         202746679 U      2/2013
CN         102086938 B      4/2013
(Continued)

OTHER PUBLICATIONS

International Search Report dated May 28, 2019, issued in counterpart International Application No. PCT/JP2019/009662 (2 pages).
(Continued)

*Primary Examiner* — Reinaldo Sanchez-Medina
*Assistant Examiner* — Nicole Gardner
(74) *Attorney, Agent, or Firm* — Westerman, Hattori, Daniels & Adrian, LLP

(57) ABSTRACT

A reciprocating body (2) has valve element (6) including deflecting surface (10a), valve shaft (7) guided by guide cylinder (4), and packing (8) having an annular shape circularly brought into close contact with valve seat (12a) in a state where the reciprocating body (2) is in a closed position. The valve element (6) includes large diameter portion (9a), and small diameter portion (9b) and deflecting portion (10). The large diameter portion (9a) has flange surface (9d) supporting the packing (8) in a state where the packing (8) is exposed to the primary flow passage side. The flange surface (9d) is formed such that the flange surface (9d) is allowed to come into contact with the valve seat (12a) via the packing (8). Recess (9c) is formed on the outer periphery of the small diameter portion (9b), and a portion of the packing (8) is fitted in the recess (9c).

18 Claims, 19 Drawing Sheets

(56) References Cited

U.S. PATENT DOCUMENTS

| | | |
|---|---|---|
| 1,754,975 A | 4/1930 | Andersen |
| 1,912,786 A | 6/1933 | Moe |
| 1,957,998 A | 5/1934 | Finefrock et al. |
| 1,963,685 A | 6/1934 | Shimer |
| 2,613,054 A | 10/1952 | Viaier |
| 3,057,372 A | 10/1962 | Sutton et al. |
| 3,240,222 A * | 3/1966 | Heil .................. F16K 15/063 137/595 |
| 3,298,393 A | 1/1967 | Mosier |
| 3,674,147 A | 7/1972 | Danti |
| 2015/0122353 A1 | 5/2015 | Chiba |
| 2016/0348628 A1 | 12/2016 | Bean et al. |

FOREIGN PATENT DOCUMENTS

| | | |
|---|---|---|
| CN | 107687524 A | 2/2018 |
| DE | 102014008069 A1 | 12/2015 |
| GB | 1490553 A | 11/1977 |
| GB | 2 153 973 A | 8/1985 |
| JP | 48-42328 Y1 | 12/1973 |
| JP | 50-83819 A | 7/1975 |
| JP | 57-184770 A | 11/1982 |
| JP | 62-66063 U | 4/1987 |
| JP | 2002-323157 A | 11/2002 |
| JP | 2010-169197 A | 8/2010 |
| JP | 2016-75356 A | 5/2016 |
| WO | 2013/180108 A1 | 12/2013 |

OTHER PUBLICATIONS

TW Office Action dated Nov. 14, 2019, issued in counterpart TW application No. 108108253 (5 pages).

Office Action dated Nov. 19, 2019, issued in counterpart JP application No. 2019-552934 (8 pages).

Office Action dated Jul. 7, 2020, issued in counterpart CN Application No. 201980003098.7, with English Translation. (26 pages).

Extended (Supplementary) European Search Report dated Nov. 30, 2020, issued in counterpart EP Application No. 19767610.9. (13 pages).

* cited by examiner

CHECK VALVE AND RECIPROCATING BODY FOR CHECK VALVE

TECHNICAL FIELD

The present invention relates to the structure of a foot valve, and relates to a lift type check valve and a reciprocating body for a check valve.

BACKGROUND ART

A check valve is known which causes a fluid in a pipe to pass through in one direction. There are various types of check valves which are classified based on the operation mode of a valve element.

Of the check valves, the lift type check valve has a structure where a valve element linearly reciprocates in a direction approaching or away from a valve seat, thus allowing a rapid closing operation. In particular, a lift type check valve of a smolensky type includes a spring and hence, it is possible to preferably suppress the occurrence of water hammering.

Patent document 1 describes a lift type check valve which includes a valve seat and a valve element which linearly reciprocally oscillates in a direction approaching or away from the valve seat, and where an inflow direction of a fluid flowing in toward the valve seat and a passing direction, along which the fluid passes through the valve element, intersect with each other. To the valve element of this lift type check valve, a deflecting surface is provided which causes a fluid to be deflected from the inflow direction to the passing direction.

CITATION LIST

Patent Document

[Patent document 1] International Publication No. WO 2013/180108

SUMMARY OF THE INVENTION

Problem to be Solved by the Invention

Incidentally, the valve element of the check valve may be provided with a packing which causes the valve element to be brought into close contact with the valve seat when the check valve is in a closed state. The body of the valve element is made of a metal material or the like. On the other hand, the packing is made of a material having elasticity, such as a rubber material.

In commercially available lift type check valves, by taking into account the weight of the valve element, flow speed, the temperature of fluid, characteristics of the fluid that the fluid is an organic solvent etc., a material sufficiently excellent in durability is generally selected also for the packing. In particular, a packing has been selected where the deterioration of water stopping performance can be suppressed in such a state where a dynamic load, a thermal load from a fluid or a chemical load is applied.

Further, of the check valves, an underwater-installation-type foot valve is allowed to have a slight amount of leakage. However, for example, in a foot valve which is installed above a water surface, the importance of increasing water stopping performance and durability of the packing is particularly high.

Inventors of the present invention have considered that water stopping performance of the packing and durability of the packing can be increased by changing the structure of check valve.

The present invention has been made in view of the above-mentioned problems, and the present invention provides a check valve having the structure which can increase water stopping performance and durability of a packing, and a reciprocating body for a check valve.

Means for Solving the Problem

According to the present invention, there is provided a lift type check valve including: a valve seat; a reciprocating body which is allowed to linearly reciprocate between a closed position, where the reciprocating body is brought into close contact with the valve seat, and an open position, where the reciprocating body is away from the valve seat; a primary flow passage which is positioned on an upstream side of the reciprocating body; a secondary flow passage which is positioned on a downstream side of the reciprocating body, and which intersects with the primary flow passage; and a guide cylinder which guides the reciprocating body such that the reciprocating body is allowed to reciprocate, wherein the reciprocating body includes: a valve element including a deflecting surface which causes a fluid to be deflected from the primary flow passage side to the secondary flow passage side in a state where the reciprocating body is in the open position, a valve shaft extending from the valve element, and guided by the guide cylinder so as to allow the reciprocating body to reciprocate, and a packing having an annular shape which is made of a material softer than the valve element, and which is circularly brought into close contact with the valve seat in a state where the reciprocating body is in the closed position, assuming the primary flow passage side as one side, the valve element includes a base portion disposed on the other side, which is a side opposite to the one side, and an extending portion extending toward the one side from the base portion, the base portion has, on the primary flow passage side, a flange surface which supports the packing in a state where the packing is exposed to the primary flow passage side, the flange surface is formed larger than the extending portion in a direction perpendicular to an axial direction of the valve shaft, and is formed such that the flange surface is allowed to come into contact with the valve seat via the packing, on an outer periphery of the extending portion, a recess is formed which is recessed relative to other parts in the direction perpendicular to the axial direction of the valve shaft, and a portion of the packing is fitted in the recess.

According to the present invention, there is also provided a reciprocating body for a check valve, used in a lift type check valve which includes: a valve seat; a reciprocating body which is allowed to linearly reciprocate between a closed position, where the reciprocating body is brought into close contact with the valve seat, and an open position, where the reciprocating body is away from the valve seat; a primary flow passage which is positioned on an upstream side of the reciprocating body; a secondary flow passage which is positioned on a downstream side of the reciprocating body, and which intersects with the primary flow passage; and a guide cylinder which guides the reciprocating body such that the reciprocating body is allowed to reciprocate, the reciprocating body including: a valve element including a deflecting surface which causes a fluid to be deflected from the primary flow passage side to the secondary flow passage side in a state where the reciprocating body is in the open position; a valve shaft extending from the valve element, and guided by the guide cylinder so as to allow the reciprocating body to reciprocate; and a packing having an annular shape which is made of a material softer than the valve element, and which is circularly brought into close contact with the valve seat in a state where the reciprocating body is in the closed position, wherein assuming the primary flow passage side as one side, the valve element includes a base portion disposed on the other side, which is a side opposite to the one side, and an extending portion extending toward the one side from the base portion, the base portion has, on the primary flow passage side, a flange surface which supports the packing in a state where the packing is exposed to the primary flow passage side, the flange surface is formed larger than the extending portion in a direction perpendicular to an axial direction of the valve shaft, and is formed such that at least a portion of the flange surface is allowed to come into contact with the valve seat via the packing, on an outer periphery of the extending portion, a recess is formed which is recessed relative to other parts in the direction perpendicular to the axial direction of the valve shaft, and a portion of the packing is fitted in the recess.

Effect of the Invention

According to the present invention, it is possible to provide a check valve and a reciprocating body for a check valve having the structure which can increase water stopping performance and durability of a packing.

BRIEF DESCRIPTION OF THE DRAWINGS

FIGS. 14A and 14B are views showing a state where a guide cylinder according to the third embodiment accommodates a valve shaft, wherein FIG. 14A is a cross-sectional view showing an XIVA-XIVA cross section in FIG. 12, and FIG. 14B is a cross-sectional view showing an XIVB-XIVB cross section in FIG. 12.

DESCRIPTION OF EMBODIMENTS

Hereinafter, embodiments of the present invention will be described with reference to drawings. 0062e that embodiments described hereinafter merely forms one example for facilitating the understanding of the present invention, and do not limit the present invention. That is, it is needless to say that the shape, size, arrangement and the like of members described hereinafter may be modified or improved without departing from the gist of the present invention, and the present invention includes equivalents thereof.

Further, in all drawings, similar constitutional elements are given identical reference symbols, and the same description will not be repeated. In this specification, there may be a case where the description is made in a state where the vertical direction is defined. The vertical direction is set for the sake of convenience to describe the relative relationship between constitutional elements, and does not limit the direction of a product according to the present invention during manufacture or in use.

First Embodiment

Figure 1:
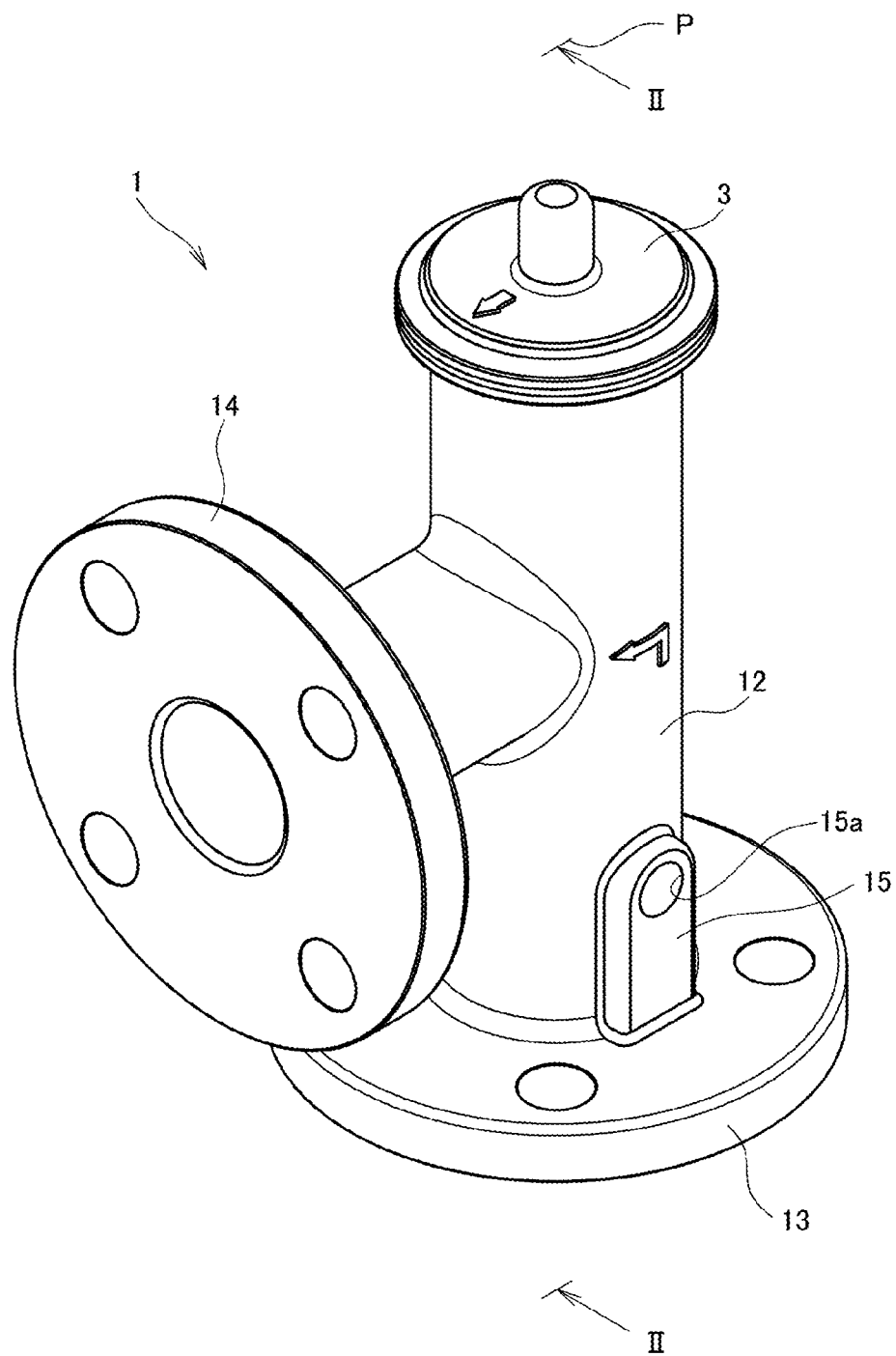
FIG. 1 is a perspective view showing the external appearance of a check valve according to a first embodiment of the present invention.
Figure 2:
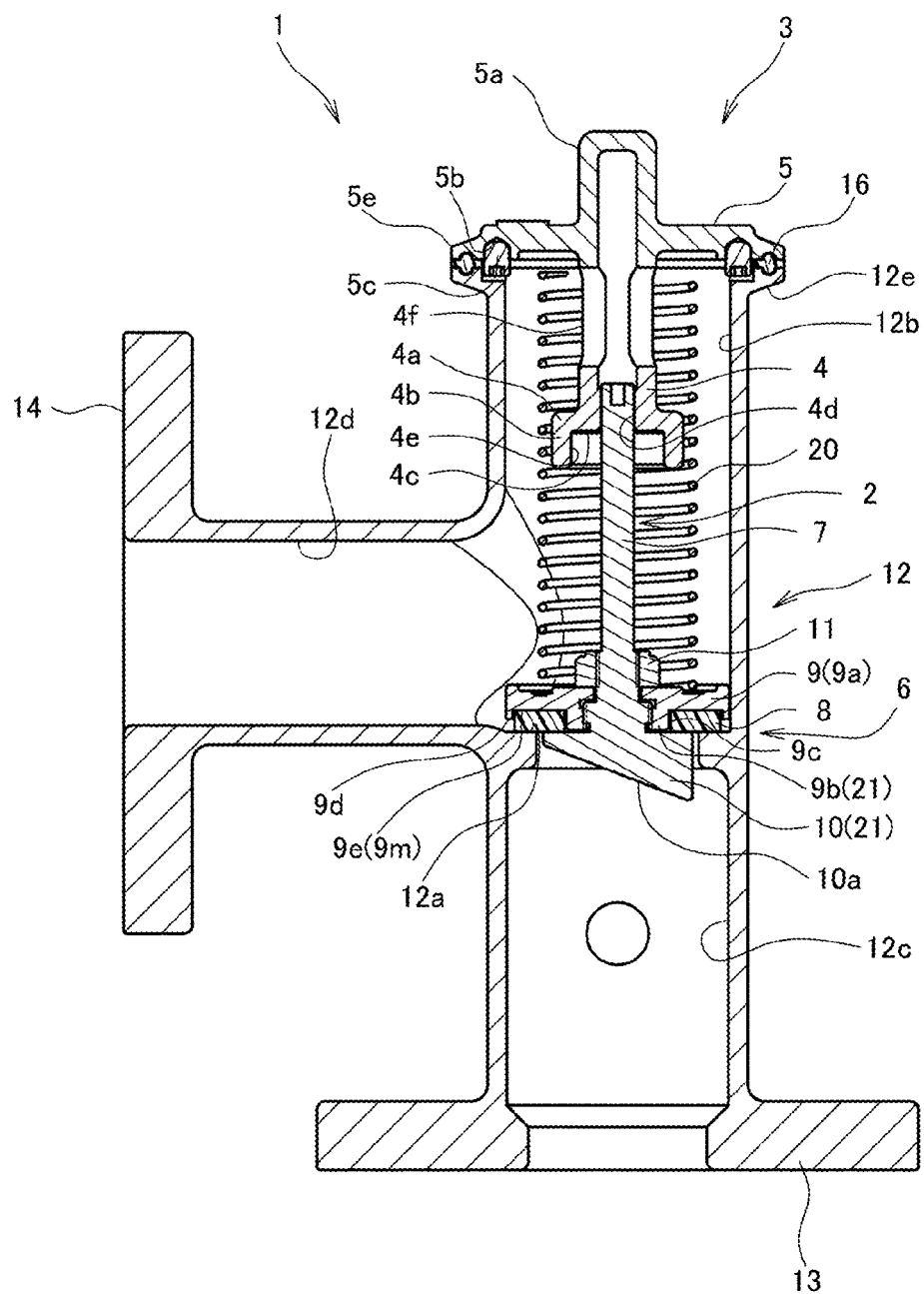
FIG. 2 is a longitudinal cross-sectional view showing a closed state of the check valve according to the first embodiment.
Figure 3:
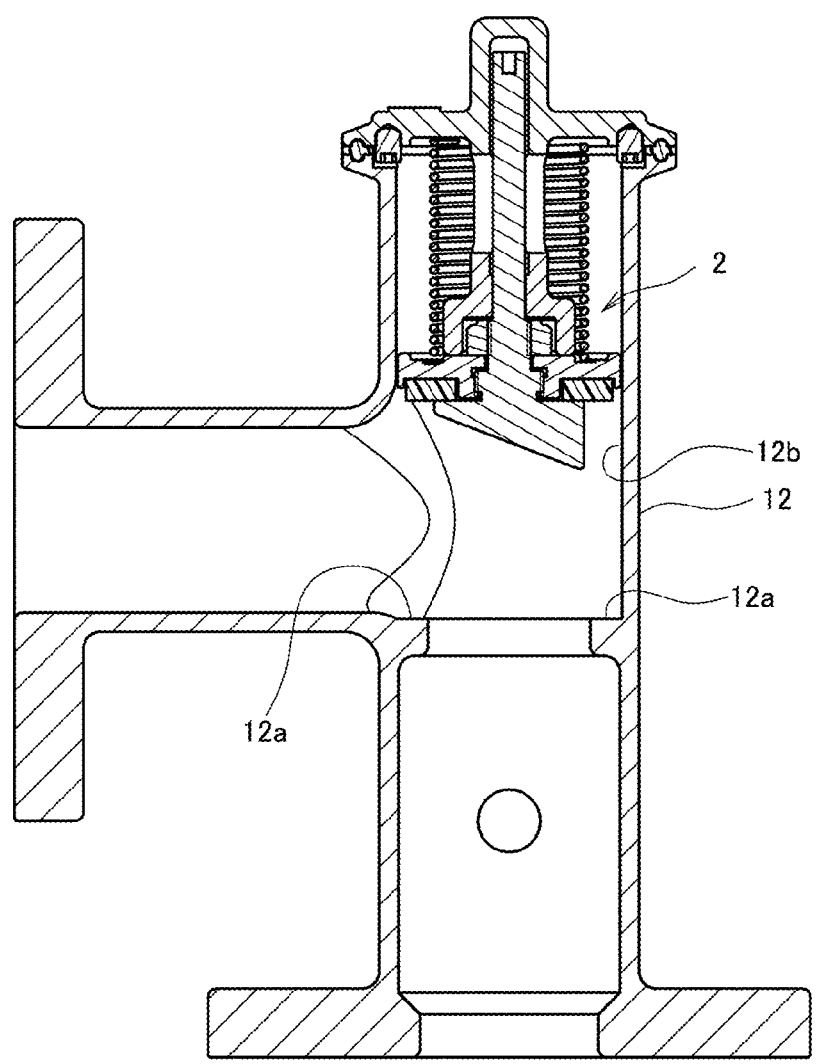
FIG. 3 is a longitudinal cross-sectional view showing an open state of the check valve according to the first embodiment.

Summary of Check Valve According to this Embodiment and Reciprocating Body Used in Check Valve First, the summary of a check valve 1 according to this embodiment and a reciprocating body 2 will be described mainly with reference to FIG. 1 to FIG. 3. FIG. 1 is a perspective view showing the external appearance of the check valve 1 according to a first embodiment of the present invention. FIG. 2 is a longitudinal cross-sectional view showing a closed state of the check valve 1. FIG. 3 is a longitudinal cross-sectional view showing an open state of the check valve 1. A cross section including the axis of a valve shaft 7 is referred to as a longitudinal cross section.

The lift type check valve 1 according to this embodiment includes a valve box 12 which has a valve seat 12a shown in FIG. 2, and the reciprocating body 2 which is allowed to linearly reciprocate as shown in FIG. 2 and FIG. 3, and which comes into contact with and is separated from the valve seat 12a. To be more specific, the reciprocating body 2 is configured such that the reciprocating body 2 is allowed to reciprocate within an opening/closing region defined by a closed position, where the reciprocating body 2 is brought into close contact with the valve seat 12*a* shown in FIG. 2, and an open position, where the reciprocating body 2 is away from the valve seat 12*a* shown in FIG. 3.

The check valve 1 further includes a primary flow passage which is positioned on the upstream side of the reciprocating body 2, a secondary flow passage which is positioned on the downstream side of the reciprocating body 2, and which intersects with the primary flow passage, and a guide cylinder 4 which guides the reciprocating body 2 such that the reciprocating body 2 is allowed to reciprocate.

The reciprocating body 2 has, as shown in FIG. 2, a valve element 6 including a deflecting surface 10*a*, the valve shaft 7 guided by the guide cylinder 4 described later, and a packing 8 having an annular shape which is circularly brought into close contact with the valve seat 12*a* in a state where the reciprocating body 2 is in a closed position. The deflecting surface 10*a* is a surface which causes a fluid from the primary flow passage side to be deflected to the secondary flow passage side when the valve element 6 is in an open position. The valve shaft 7 extends from the valve element 6, and is guided by the guide cylinder 4 so as to allow the reciprocating body 2 to reciprocate. The packing 8 is made of a material softer than the valve element 6.

Assuming a primary flow passage side as one side (bottom side), the valve element 6 includes a base portion (a large diameter portion 9*a* of a guide washer 9) disposed on the other side (upper side), which is the side opposite to the one side, and an extending portion 21 extending toward the one side from the base portion (the large diameter portion 9*a* of the guide washer 9). In this embodiment, the extending portion 21 refers to a part which extends toward the bottom side from the large diameter portion 9*a*, and refers to the part which includes a portion of the guide washer 9 and a deflecting portion 10, the guide washer 9 and the deflecting portion 10 being separate members. Specifically, the extending portion 21 refers to a part which includes a small diameter portion 9*b* of the guide washer 9, and the deflecting portion 10 integrally formed with the lower portion of the valve shaft 7, and inserted into the large diameter portion 9*a*.

The base portion (the large diameter portion 9*a* of the guide washer 9) has, on the primary flow passage side, a flange surface 9*m* which supports the packing 8 in a state where the packing 8 is exposed to the primary flow passage side.

The flange surface 9*m* is formed larger than the extending portion 21 in the direction perpendicular to the axial direction of the valve shaft 7. The flange surface 9*m* is formed such that at least a portion of the flange surface 9*m* is allowed to come into contact with the valve seat 12*a* via the packing 8.

On the outer periphery of the extending portion 21 (small diameter portion 9*b*), a recess 9*c* is formed which is recessed relative to other parts (the upper portion of the deflecting portion 10 disposed below the small diameter portion 9*b*) in the direction perpendicular to the axial direction of the valve shaft 7, and a portion of the packing 8 is fitted in the recess 9*c*.

According to the check valve 1 having the above-mentioned configuration, when the reciprocating body 2 reciprocates, the base portion (the large diameter portion 9*a* of the guide washer 9) repeatedly comes into contact with the valve seat 12*a* via the packing 8 and hence, it is possible to reduce an impact applied to the base portion (the large diameter portion 9*a* of the guide washer 9).

In particular, a contact surface between the packing 8 and the valve seat 12*a* is perpendicular to a reciprocating direction of the reciprocating body 2 and hence, even when the reciprocating body 2 (packing 8) repeatedly comes into contact with the valve seat 12*a*, a stress applied to the packing 8 can be dispersed from the contact part symmetrically with respect to the surface direction.

Assume the case where the contact surface between the packing 8 and the valve seat 12*a* is parallel to the deflecting surface 10*a* (the case where the contact surface obliquely intersects with the reciprocating direction of the reciprocating body 2). In such a case, the component of force in a sliding direction with respect to the flange surface 9*m* described later is generated and hence, the packing 8 is easily deformed in a direction intersecting with the axial direction of the reciprocating body 2.

On the other hand, as described above, the contact surface between the packing 8 and the valve seat 12*a* is perpendicular to the reciprocating direction of the reciprocating body 2 and hence, drag applied to the packing 8 from the valve seat 12*a* can be dispersed from the contact part symmetrically with respect to the surface direction as a stress which is not significantly one-sided in the surface direction of the packing 8. That is, it is possible to suppress that the packing 8 is deformed in a one-sided manner in the surface direction and hence, water stopping performance and durability of the packing 8 can be enhanced.

Further, the packing 8 is fitted in the recess 9*c* on the extending portion 21 (the small diameter portion 9*b*, the deflecting portion 10) and hence, even if a contact load from the valve seat 12*a* is repeatedly applied to the packing 8, it is possible to suppress the removal of the packing 8 from the reciprocating body 2. Accordingly, the packing 8 can be used for a long period of time, thus increasing durability.

<Configurations of Respective Portions>

Figure 4:
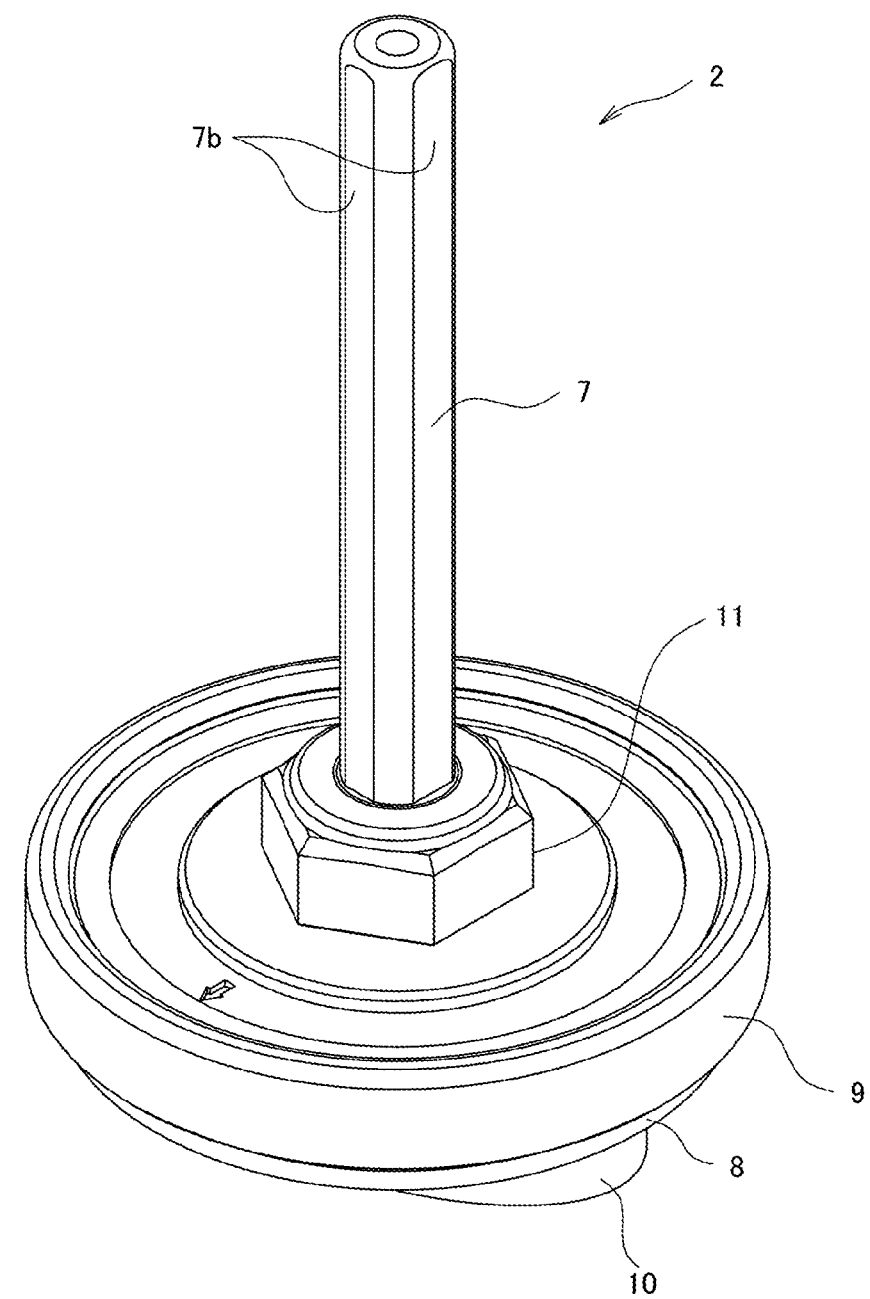
FIG. 4 is a perspective view showing the upper side of a reciprocating body which forms the check valve according to the first embodiment.
Figure 5:
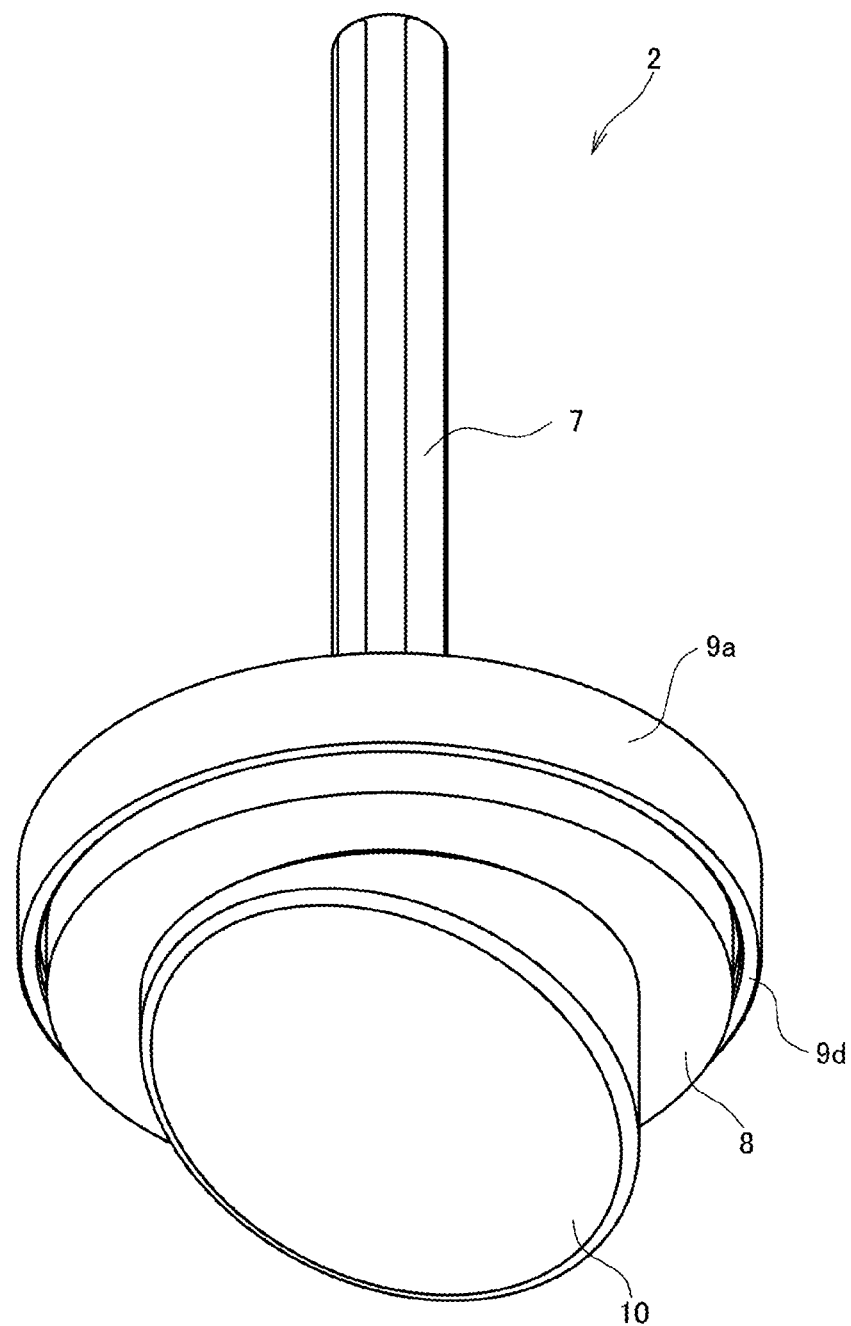
FIG. 5 is a perspective view showing the bottom side of the reciprocating body according to the first embodiment.
Figure 6:
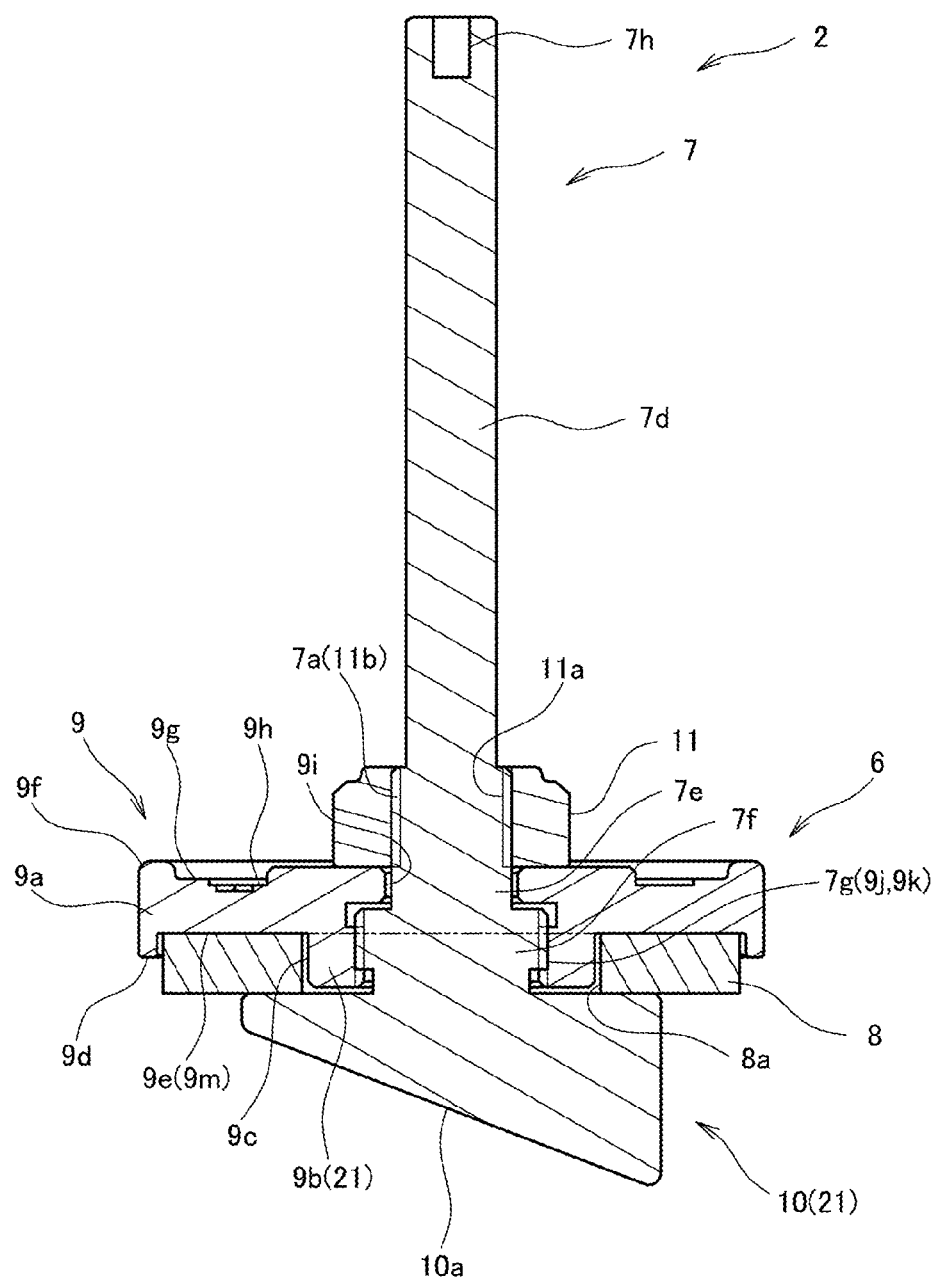
FIG. 6 is a longitudinal cross-sectional view of the reciprocating body according to the first embodiment.
Figure 7:
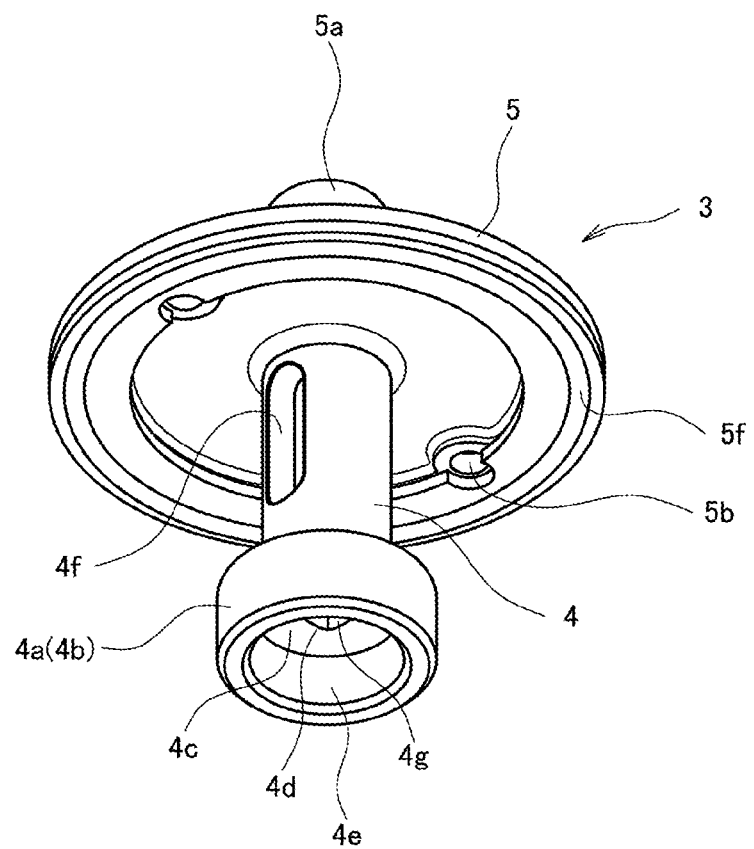
FIG. 7 is a perspective view showing the bottom side of a guide cap according to the first embodiment.

Next, the configurations of respective portions which form the check valve 1 according to the first embodiment will be described with reference to FIG. 4 to FIG. 7 in addition to FIG. 1 to FIG. 3. FIG. 4 is a perspective view showing the upper side of the reciprocating body 2 which forms the check valve 1 according to the first embodiment. FIG. 5 is a perspective view showing the bottom side of the reciprocating body 2. FIG. 6 is a longitudinal cross-sectional view of the reciprocating body 2. FIG. 7 is a perspective view showing the bottom side of a guide cap 3 according to the first embodiment.

The check valve 1 according to this embodiment is a lift type valve where the reciprocating body 2, including the valve element 6, linearly reciprocally oscillates in a direction approaching or away from the valve seat 12*a*. A fluid where backflow is restricted by the check valve 1 is liquid, such as water, or a gas, such as air.

In the closed state shown in FIG. 2, the valve element 6 is biased by a spring body 20, thus being pressed against the valve seat 12*a*. The check valve 1 of this embodiment is of a so-called smolensky type. Accordingly, at the moment when the flow of a fluid changes to a backflow, which flows from the secondary side to the primary side, the valve element 6 of the check valve 1 comes into contact with the valve seat 12*a* due to a biasing force brought about by the spring body 20, thus rapidly closing the flow passage. Therefore, the occurrence of water hammering can be suppressed by preventing the backflow and hence, the certainty of the closed state (water stopping performance) can be increased.

However, the check valve 1 is not limited to the configuration which includes the spring body 20, and presses the valve element 6 against the valve seat 12*a*. For example, the check valve 1 may be configured such that the valve element 6 is pressed against the valve seat 12*a* only by the dead weight of the reciprocating body 2, or by the dead weight of the reciprocating body 2 and a load applied from a damper mechanism formed of the valve shaft 7 and the guide cylinder 4 described later.

Further, the check valve 1 according to this embodiment is an angle valve. Specifically, the check valve 1 includes the primary flow passage, which is positioned on the upstream side of a region where the valve element 6 reciprocates, and the secondary flow passage which intersects with the primary flow passage with the region where the valve element 6 reciprocates interposed therebetween.

When the check valve 1 of this embodiment is used on the primary side of a lifting pump (not shown in the drawing) as a so-called foot valve, the certainty of stopping water is increased and hence, it is possible to preferably prevent waterfall in a lifting pipe.

The check valve 1 is provided to a flow passage through which liquid or a gas (fluid) is caused to flow. When a differential pressure between the primary side and the secondary side of the valve element 6 exceeds a predetermined minimum operating pressure (cracking pressure), the valve element 6 is brought into an open state to cause a fluid to flow. When the differential pressure between the primary side and the secondary side of the valve element 6 becomes negative or equal to or less than the minimum operating pressure, the valve element 6 is brought into a closed state as shown in FIG. 2 to shut off the flow of the fluid.

Note that there may be also a case where the movement of the valve element 6 is inhibited by the pressure of residual air in a boss 5a of the guide cap 3 described later and hence, provided that the desired amount of flow area can be ensured, the valve element 6 is not necessarily configured to be brought into a fully-open state. Although FIG. 3 shows the fully-open state of the valve element 6, the degree of opening of the valve element 6 varies corresponding to a flow rate depending on the mass of the reciprocating body 2 and the restoring force of the spring body 20.

The check valve 1 includes the reciprocating body 2, the valve box 12 which has the valve seat 12a and accommodates the reciprocating body 2, a cap (guide cap 3) which has the guide cylinder 4 and is mounted on the valve box 12, and a biasing member (spring body 20) which is provided between the valve element 6 and the cap (guide cap 3) to bias the valve element 6 toward the primary flow passage side. That is, the check valve 1 in this specification refers to the entire pipe joint which includes the valve element 6 and the like therein.

The valve box 12 according to this embodiment is integrally formed by lost wax process, and is formed into a substantially T shape as a whole. A flange portion 13 is integrally formed on the upstream side (primary side) of the valve box 12, and a flange portion 14 is integrally formed on the downstream side (secondary side) of the valve box 12. The valve box 12 is fixed to pipes (not shown in the drawing) using fasteners (not shown in the drawing), such as bolts and nuts. As shown in FIG. 1, a flat mounting base 15 for mounting a suction pipe (not shown in the drawing), connected to a suction pump (not shown in the drawing), is formed on the valve box 12 within a range from the lower side surface of the T-shaped part to the upper surface of the flange portion 13 on the center side. A pressure reducing port 15a, which penetrates to the inside of the valve box 12 on the primary flow passage side, is formed in the mounting base 15.

An operator operates the suction pump to draw a fluid from the suction pipe toward the pressure reducing port 15a so that the upstream side of the valve element 6 can be brought into a negative pressure, thus being filled with a fluid. Note that by adopting the configuration where a pressure sensor is mounted on the pressure reducing port 15a, the operator can check whether or not the inside of the valve box 12 is filled with a fluid by checking the state of a pressure in the inside of the valve box 12.

Furthermore, the guide cap 3 described later is detachably attached to the extension of the valve box 12 in the flow direction on the upstream side.

As shown in FIG. 2, a part of the valve box 12 which is on the extension of the lower side of an outflow passage 12d, and which overlaps with the inflow direction of an inflow passage 12c forms the valve seat 12a of the check valve 1. The valve seat 12a is formed into a ring shape which protrudes from the inner wall of the valve box 12 to narrow the inflow passage 12c and extends circularly.

The reciprocating body 2 reciprocates in the inside of the valve box 12 to cause the valve element 6 to be close to and to be separated from the valve seat 12a between the primary flow passage and the secondary flow passage, thus preventing backflow while adjusting the amount of opening of the valve element 6 corresponding to a flow rate.

The reciprocating body 2 is mainly formed of the valve shaft 7 extending in a reciprocating direction, the valve element 6 provided to the lower end portion of the valve shaft 7, and the packing 8 mounted on the valve element 6 such that the packing 8 is allowed to come into contact with the valve seat 12a.

As shown in FIG. 6, the valve shaft 7 is a member which is accommodated in the guide cylinder 4 described later, thus causing the reciprocating body 2 to reciprocate such that the reciprocating body 2 is prevented from shifting in a direction perpendicular to the axial direction of the valve shaft 7. The valve shaft 7 is formed into a rod shape, and stands upright from the upper surface of the valve element 6. Most of the upper surface of the valve element 6 is orthogonal to the axial direction of the valve shaft 7 (the vertical direction in FIG. 6).

The valve shaft 7 has a small diameter portion 7d, an intermediate diameter portion 7e, and a large diameter portion 7f in this order from the upper end toward the lower end which is connected to the deflecting portion 10.

The small diameter portion 7d is a part which is accommodated in the guide cylinder 4 described later.

The intermediate diameter portion 7e is a part which is made to pass through an insertion hole 9i of the guide washer 9 described later, and is provided in the vicinity of the lower end of the valve shaft 7. A threaded portion 7a is formed on the outer peripheral surface of a portion above the intermediate diameter portion 7e. The threaded portion 7a is a part with which a threaded engagement portion (female threads) 11b of a nut 11 described later is threadedly engaged.

A threaded portion 7g is formed on the outer peripheral surface of the large diameter portion 7f. The threaded portion 7g is a part with which a threaded engagement portion (female threads) 9j of the guide washer 9 described later is threadedly engaged.

The valve element 6 and the valve shaft 7 are made of stainless steel. However, the valve element 6 and the valve shaft 7 may also be made of a synthetic resin material having corrosion resistance, such as polyvinyl chloride, for example. In a closed state shown in FIG. 2 and an open state shown in FIG. 3, the spring body 20 fitted on the periphery of the valve shaft 7 elastically biases the upper surface of the valve element 6 (the guide washer 9). As shown in FIG. 6, a relief hole 7h is formed in the axial direction at the center of the upper end portion of the valve shaft 7. With the formation of the relief hole 7h, the relief hole 7h acts as an escape space for a fluid when the valve shaft 7 is accommodated in the guide cylinder 4. Accordingly it is possible to suppress that a pressure in the guide cylinder 4 increases, thus interrupting the movement of the reciprocating body 2.

The valve element 6 is formed of the deflecting portion 10 integrally formed with the end portion of the valve shaft 7 on the lower side (primary flow passage side), and the guide washer 9 mounted on the valve shaft 7.

The deflecting portion 10 has a function of causing the flow of a fluid to be deflected from the primary flow passage to the secondary flow passage intersecting with the primary flow passage. The deflecting portion 10 has the deflecting surface 10a, which is cut obliquely with respect to the axial direction of the valve shaft 7, on the bottom surface.

The deflecting surface 10a is a flat surface which is obliquely inclined with respect to the upper surface of the deflecting portion 10. That is, the deflecting portion 10 is formed such that the portion of the deflecting portion 10 in the vicinity of the secondary flow passage is formed with a small wall thickness, and the thickness of the deflecting portion 10 gradually increases as the deflecting portion 10 is away from the secondary flow passage.

In this embodiment, "to cause a fluid to be deflected" refers to the configuration where compared with a case where a fluid collides with a surface which is orthogonal to and opposedly faces the inflow direction, the flowing direction of the fluid after the collision with the deflecting surface directs more in the direction of the secondary flow passage. The deflecting surface 10a having such a configuration causes the fluid to be deflected in the passing direction, along which the valve element 6 passes, from the inflow direction, along which the fluid flows toward the valve seat 12a, and hence, when the fluid passes through the valve element 6, it is possible to suppress the lowering of the speed of the fluid. Accordingly, also in the lift type check valve 1 where the inflow direction to the valve seat 12a and the passing direction along which the valve element 6 passes intersect with each other, a fluid can be caused to flow with low loss of head (friction resistance).

The guide washer 9 is brought into slide contact with an inner wall 12b of the valve box 12 so as to prevent the lower end side of the reciprocating body 2 from shifting in the direction perpendicular to the axial direction of the valve shaft 7 when the reciprocating body 2 reciprocates. Accordingly, the guide washer 9 has a function of guiding the movement of the reciprocating body 2. Further, the guide washer 9 has an upper surface pushed by the nut 11, thus having a function as a washer which supports the packing 8 uniformly in the surface direction between the guide washer 9 and the deflecting portion 10.

The guide washer 9 is, as shown in FIG. 6, mounted on the periphery of the lower end portion of the valve shaft 7, and includes the large diameter portion 9a on the upper side, and the small diameter portion 9b, formed concentrically with the large diameter portion 9a, on the lower side. At the center of the guide washer 9, the insertion holes 9i, 9k are formed to penetrate in the wall thickness direction. The insertion hole 9i is disposed at a part where the intermediate diameter portion 7e of the valve shaft 7 is made to pass through in a state where the valve shaft 7 is mounted on the guide washer 9. The insertion hole 9k is disposed at a position which is lower than and communicates with the insertion hole 9i, and is disposed at a part where the large diameter portion 7f of the valve shaft 7 is made to pass through in a state where the valve shaft 7 is mounted on the guide washer 9. At the lower portion of the inner peripheral surface forming the insertion hole 9i, the threaded engagement portion (female threads) 9j is formed which is threadedly engaged with the threaded portion 7g of the large diameter portion 7f.

The large diameter portion 9a of the guide washer 9 has an outer diameter slightly smaller than the diameter of the inner wall 12b of the valve box 12 which extends upward from the valve seat 12a.

The base portion of the valve element 6 (the large diameter portion 9a of the guide washer 9) has an annular upper peripheral edge portion 9f which is formed to protrude more toward the distal end side (upper end side) of the valve shaft 7 than other parts. The upper peripheral edge portion 9f is formed along the inner wall 12b of a part of the valve box 12 which accommodates the reciprocating body 2.

As described above, according to the configuration where the large diameter portion 9a of the guide washer 9 includes the upper peripheral edge portion 9f, when the reciprocating body 2 reciprocates, the large diameter portion 9a of the guide washer 9 is brought into slide contact with the inner wall 12b of the valve box 12. Accordingly, it is possible to suppress that the reciprocating body 2 is significantly shifted.

Specifically, the upper peripheral edge portion 9f of the valve element 6, which is the portion of the reciprocating body 2, is brought into slide contact with the inner wall 12b and hence, it is possible to suppress that the reciprocating body 2 oscillates in the direction perpendicular to the vertical direction (the axial direction of the valve shaft 7).

Note that provided that oscillation of the reciprocating body 2 can be suppressed, the upper peripheral edge portion 9f is not necessarily limited to a portion formed into an annular shape. For example, the upper peripheral edge portion 9f may be configured such that a plurality of protrusions are disposed in an annular shape at intervals.

The base portion of the valve element 6 in this embodiment refers to a part where the large diameter portion 9a of the guide washer 9 is present, and is a part disposed above a two-dot chain line in FIG. 6. The extending portion 21 of the valve element 6 corresponds to a part which includes the small diameter portion 9b of the guide washer 9 and the deflecting portion 10, and which is disposed below the two-dot chain line in FIG. 6.

At a position on the upper side of the large diameter portion 9a of the guide washer 9, and on the inside of the upper peripheral edge portion 9f in the radial direction, an upper recessed portion 9g is formed which is recessed downward (toward the primary flow passage side) more than the upper peripheral edge portion 9f. Further, at a position on the inside of the upper recessed portion 9g in the radial direction, a spring seat surface 9h is formed, which is recessed downward (toward the primary flow passage side) more than the upper recessed portion 9g. The spring seat surface 9h is a seat surface which supports the lower end of the spring body 20.

As shown in FIG. 2, a flange-side recessed portion 9e which accommodates the packing 8 described later is formed on the flange surface 9m which is a surface on the lower side of the base portion (the large diameter portion 9a of the guide washer 9) of the valve element 6. To be more precise, the bottom surface of the flange-side recessed portion 9e forms the flange surface 9m, and the flange-side recessed portion 9e is formed to be recessed upward more than a bottom-side peripheral edge portion 9d on the lower surface of the guide washer 9.

In the direction perpendicular to the valve shaft 7, the flange-side recessed portion 9e is formed with a size which allows the flange-side recessed portion 9e to overlap with the valve seat 12a. The upper portion of the packing 8 is accommodated in the flange-side recessed portion 9e.

As described above, at least a portion of the packing 8 is accommodated in the flange-side recessed portion 9e so that an operator can mount the valve shaft 7 and the deflecting portion 10 on the guide washer 9 in a state where the packing 8 is accommodated and positioned in the flange-side recessed portion 9e. Accordingly, the guide washer 9 and the valve shaft 7 can be easily assembled such that the packing 8 is sandwiched by the guide washer 9 and the deflecting portion 10.

The small diameter portion 9b, which is shorter than the outer diameter of the deflecting portion 10 in the radial direction, is formed so that the recess 9c is formed on the outer periphery of the deflecting portion 10, forming the extending portion 21, and the outer periphery of the small diameter portion 9b. This recess 9c is formed such that a part formed into an L shape in cross section by the lower surface of the large diameter portion 9a and the peripheral surface of the small diameter portion 9b, continuously formed from the lower surface of the large diameter portion 9a, and the flat upper surface of the deflecting portion 10 are made to overlap with each other. It is sufficient to have the recess 9c to an extent that the packing 8 can be fitted. Accordingly, overlapping of such surfaces is not limited to overlapping where the surfaces are brought into close contact, and a slight gap may be present as shown in FIG. 6.

In addition, the recess 9c, which is recessed on the guide washer 9 in the radial direction, and the flange-side recessed portion 9e, which is recessed upward from the bottom-side peripheral edge portion 9d, are spatially continuously formed. The outer diameter of an annular space formed by the recess 9c and the flange-side recessed portion 9e is formed larger than the outer diameter of the packing 8.

The packing 8 is a member which is pressed by the valve element 6 and the valve seat 12a when the check valve 1 is in a closed state so as to stop water at the valve seat 12a. The packing 8 is disposed between the guide washer 9 and the deflecting portion 10.

The packing 8 is, as shown in FIG. 6, formed into an annular shape while having a center hole 8a which penetrates in the thickness direction. In the direction perpendicular to the axial direction of the valve shaft 7, the center hole 8a is formed smaller than the diameter of the outer peripheral surface of the large diameter portion 9a of the guide washer 9 and the diameter of the deflecting portion 10, and larger than the diameter of the small diameter portion 9b of the guide washer 9.

The small diameter portion 9b of the guide washer 9 is made to pass through the center hole 8a of the packing 8 and hence, the packing 8 is disposed on the periphery of the small diameter portion 9b.

In particular, the packing 8 according to this embodiment is made of rubber, thus having excellent deformability and being brought into close contact with the valve seat 12a. Accordingly, water can be preferably stopped.

At least a portion of the packing 8 is positioned behind the deflecting portion 10 when viewed in the upward direction assuming the reciprocating direction of the reciprocating body 2 as the vertical direction. Meanwhile, all of the packing 8 is positioned behind the guide washer 9 when viewed in the downward direction.

The packing 8 and the flange-side recessed portion 9e of the guide washer 9 may be additionally bonded (or bonded by adhesion) by an adhesive material, such as an adhesive or a double-sided tape. For the adhesive, a water-resistant synthetic adhesive, such as an acrylic emulsion adhesive or an ethylene-vinyl acetate resin emulsion adhesive, may be used, for example. Further, for the double-sided tape, a tape can be used where a water-resistant synthetic-resin-based adhesive, such as an acrylic adhesive, is applied by coating to both surfaces of a sheet base material.

As shown in FIG. 6, the packing 8 is sandwiched between the surface of the base portion (the large diameter portion 9a of the guide washer 9) on the primary flow passage side and the portion of the extending portion 21 (deflecting portion 10). The base portion (the large diameter portion 9a of the guide washer 9) and the extending portion 21 (the lower portion of the valve shaft 7 and the deflecting portion 10) are formed by assembling separate members (the guide washer 9, the valve shaft 7 and the deflecting portion 10).

As described above, the base portion and the extending portion 21 are formed by assembling the separate members (the guide washer 9, the valve shaft 7, and the deflecting portion 10) and hence, the packing 8 can be easily disposed between the base portion and the extending portion 21. However, the configuration is not limited to such a configuration. Provided that the packing 8 has flexibility so that the packing 8 can be mounted on the valve element 6 by causing the packing 8 to be deformed, the base portion and the extending portion 21 are not necessarily formed of separate members.

In particular in this embodiment, separate members are threadedly engaged with each other so that the packing 8 is sandwiched between these separate members.

Specifically, the threaded portion 7g is formed on the outer periphery of the large diameter portion 7f disposed at the lower portion of the valve shaft 7. On the inner periphery of the ring-shaped small diameter portion 9b which extends downward from the center portion of the large diameter portion 9a of the guide washer 9, the threaded engagement portion 9j is formed which is threadedly engaged with the threaded portion 7g.

In a state where the packing 8 is disposed on the flange-side recessed portion 9e of the guide washer 9, an operator causes the valve shaft 7 to pass through the insertion hole 9i of the guide washer 9 from the distal end, and causes the threaded engagement portion 9j to be threadedly engaged with the threaded portion 7g. With such operations, the packing 8 is sandwiched between the deflecting portion 10, which is formed larger than the inner diameter of the packing 8 in the radial direction and the flange-side recessed portion 9e.

The operator assembles the valve shaft 7, which is integrally formed with the deflecting portion 10 being a separate member, and the guide washer 9 by thread engagement so that the packing 8 is sandwiched between the guide washer 9 and the deflecting portion 10. With such a configuration, even if the reciprocating body 2 reciprocates, the coupled state between the extending portion 21 (the lower portion of the valve shaft 7 and the deflecting portion 10) and the base portion (the large diameter portion 9a of the guide washer 9) can be easily maintained.

The check valve 1 further includes a locking member (nut 11) which presses the base portion (the large diameter portion 9a of the guide washer 9) from the other side (upper side) toward the extending portion 21 (the lower portion of the valve shaft 7 and the deflecting portion 10).

The base portion (the large diameter portion 9a of the guide washer 9) has, as described above, a first insertion hole (insertion holes 9i, 9k) allowing the insertion of the valve shaft 7 at the center. The insertion hole 9i is formed to penetrate the guide washer 9 in the thickness direction. The valve shaft 7 has the threaded portion 7a on the outer peripheral surface of a portion on the other side (upper side) of the base portion (the large diameter portion 9a of the guide washer 9) in a state where the guide washer 9 is mounted.

The locking member (nut 11) has a second insertion hole (insertion hole 11a) allowing the insertion of the valve shaft 7, and has the threaded engagement portion 11b, which is threadedly engaged with the threaded portion 7a, on the inner peripheral surface of the second insertion hole (insertion hole 11a).

The nut 11 has an elastically deformable friction ring, thus having a locking function. The check valve 1 includes the nut 11, thus strengthening the coupling between the guide washer 9 and the packing 8 and the extending portion 21 (the lower portion of the valve shaft 7 and the deflecting portion 10).

Note that it is sufficient that the nut 11 has a locking function so that the nut 11 is not limited to a nut having a friction ring. For example, the nut 11 may be formed of a double nut (not shown in the drawing). Specifically, it is sufficient that one nut of the double nut has a wedge-shaped protrusion, and the other nut has a recessed groove formed with a shape which can receive the protrusion.

Further, provided that the nut 11 can press the guide washer 9 toward the deflecting portion 10 so as to prevent the guide washer 9 and the deflecting portion 10 from being separated from each other, the nut 11 may have other configurations. For example, the nut 11 may be formed of a compression spring (not shown in the drawing) and a protrusion (not shown in the drawing) on the valve shaft 7, the protrusion protruding outward from the valve shaft 7 in the radial direction. Specifically, by causing the protrusion to hold one end portion of the compression spring, and by causing the other end portion of the compression spring to come into contact with the guide washer 9, the guide washer 9 can be pressed toward the deflecting portion 10.

The guide cap 3 is, as shown in FIG. 2, a member which guides the reciprocation of the reciprocating body 2 while being detachably attached to the valve box 12 to seal the upper side of the valve element 6. The guide cap 3 is, as shown in FIG. 2 and FIG. 7, formed of the guide cylinder 4 and a disk-shaped top plate portion 5 integrally formed with the upper end of the guide cylinder 4.

The top plate portion 5 has a ferrule flange 5e shown in FIG. 2 at the end edge, and a seat surface 5f of the ferrule flange 5e (see FIG. 7) is made to overlap with a ferrule flange 12e, which is formed at the upper end portion of the valve box 12, via a gasket 16, and is detachably fastened by a ferrule joint (not shown in the drawing). Due to the ferrule joint, an operator can manually remove or mount the guide cap 3 from or on the valve box 12 without using a tool, such as a wrench or a driver, so that the valve element 6 and the spring body 20 can be easily cleaned or replaced.

At parts of the top plate portion 5 on the inner side of the seat surface 5f of the ferrule flange 5e in the radial direction, the part opposing the upper end portion of the valve box 12, as shown in FIG. 2, two setscrews 5c are mounted in two mounting holes 5b. The setscrews 5c are engaged with grooves formed on the upper end portion of the valve box 12, thus restricting the turning of the guide cap 3 with respect to the valve box 12.

At substantially the center of the top plate portion 5, the guide cylinder 4 is erected toward the lower side (the primary flow passage side).

The guide cylinder 4 is a member which guides sliding of the valve shaft 7 of the valve element 6 along the inner surface of the guide cylinder 4. The guide cylinder 4 extends from the top plate portion 5 toward the lower side which is the valve seat 12a side, and guides the valve shaft 7 connected to the valve element 6 such that the valve element 6 is allowed to reciprocate.

At the part of the guide cylinder 4 which accommodates the valve shaft 7, two through holes 4f are formed which penetrate in the direction intersecting with the axial direction of the valve shaft 7 on a plane which includes the deflection direction.

As described above, the through holes 4f are formed in the guide cylinder 4. Accordingly, at the time of the reciprocation of the reciprocating body 2, a fluid which is present between the valve shaft 7 and the guide cylinder 4 can be discharged to the outside of the guide cylinder 4 through the through holes 4f and hence, the pressure in the inside of the guide cylinder 4 can be equalized. That is, with the formation of the through holes 4f, it is possible to prevent the guide cylinder 4 from functioning as a damper and hence, the valve element 6 can easily open.

In particular, in this embodiment, the boss 5a, which protrudes upward from the top plate portion 5 of the guide cap 3, is formed on the extension of the guide cylinder 4. Further, the guide cap 3 is configured such that the valve shaft 7 can be accommodated in the boss 5a in a vicinity where the reciprocating body 2 assumes a fully-open state. Further, a through hole is not formed in the guide cap 3.

That is, the boss 5a functions as a damper when the reciprocating body 2 is elevated by an amount equal to or more than the predetermined amount, thus gently preventing the reciprocating body 2 from assuming a fully-open state.

Although the detailed description will be made later, to suppress that the reciprocating body 2 assumes a fully-open state and to control the flow of a fluid such that the flow of the fluid is prevented from impinging on the corner of the valve box 12, it is preferable to provide an accommodating portion for the valve shaft 7 having no through hole, similar to the boss 5a, and to cause the accommodating portion to function as a damper. Note that also in this case, provided that a part having no through hole is provided to a portion of the guide cylinder 4 above the through holes 4f, it is not necessary to include the boss 5a protruding from the top plate portion 5.

The guide cylinder 4 has a large diameter portion 4a at the lower end portion, and has a cylindrical standing wall 4b which protrudes from the peripheral edge of the large diameter portion 4a toward the valve element 6. The standing wall 4b is formed at the position which separates, in the direction perpendicular to the axial direction of the valve shaft 7, an inlet 4d of the guide cylinder 4, which accommodates the valve shaft 7, and a biasing member (the spring body 20).

The inlet 4d of the guide cylinder 4, which accommodates the valve shaft 7, and the spring body 20 can be separated from each other by the standing wall 4b and hence, it is possible to suppress the entry of the spring body 20 into the inlet 4d.

As shown in FIG. 4, the valve shaft 7 in this embodiment has, in the circumferential direction, four planar portions 7b, which extend parallel to the axial direction, thus having a non-circular transverse cross section. In the same manner, as shown in FIG. 7, the guide cylinder 4 has, at least at a portion thereof which overlaps with the valve shaft 7 in the region where the valve shaft 7 reciprocates, four planar portions 4g which extend parallel to the axial direction, thus having a non-circular transverse cross section which corresponds to the valve shaft 7. With such a configuration, the valve shaft 7 can move forward and backward in the axial direction without rotating with respect to the guide cylinder 4.

In the guide cylinder 4, an accommodating recessed portion 4e, which accommodates the locking member (the nut 11), is formed on the inner side of the standing wall 4b in the radial direction. The locking member (nut 11) comes into contact with an accommodation bottom surface 4c of the accommodating recessed portion 4e in a state where the reciprocating body 2 is in a fully-open position. As described above, by causing the nut 11 to come into contact with the accommodation bottom surface 4c of the accommodating recessed portion 4e provided to the guide cylinder 4, the position of the reciprocating body 2 in a fully-open state can be determined. Further, in a state where the nut 11 is accommodated in the accommodating recessed portion 4e, vibrations of the nut 11 can be restricted by the accommodating recessed portion 4e.

Second Embodiment

Figure 8:
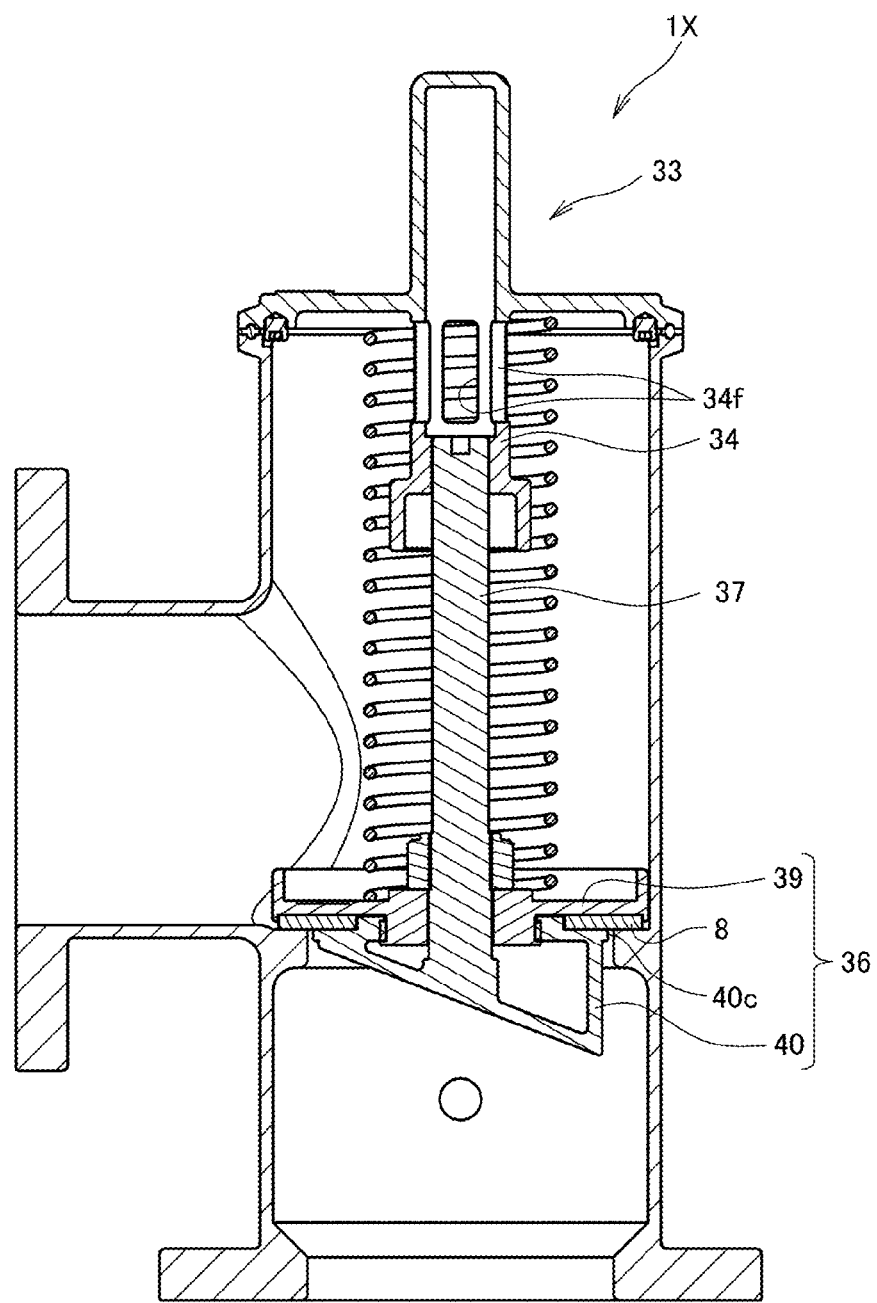
FIG. 8 is a longitudinal cross-sectional view showing a closed state of a check valve according to a second embodiment of the present invention.
Figure 9:
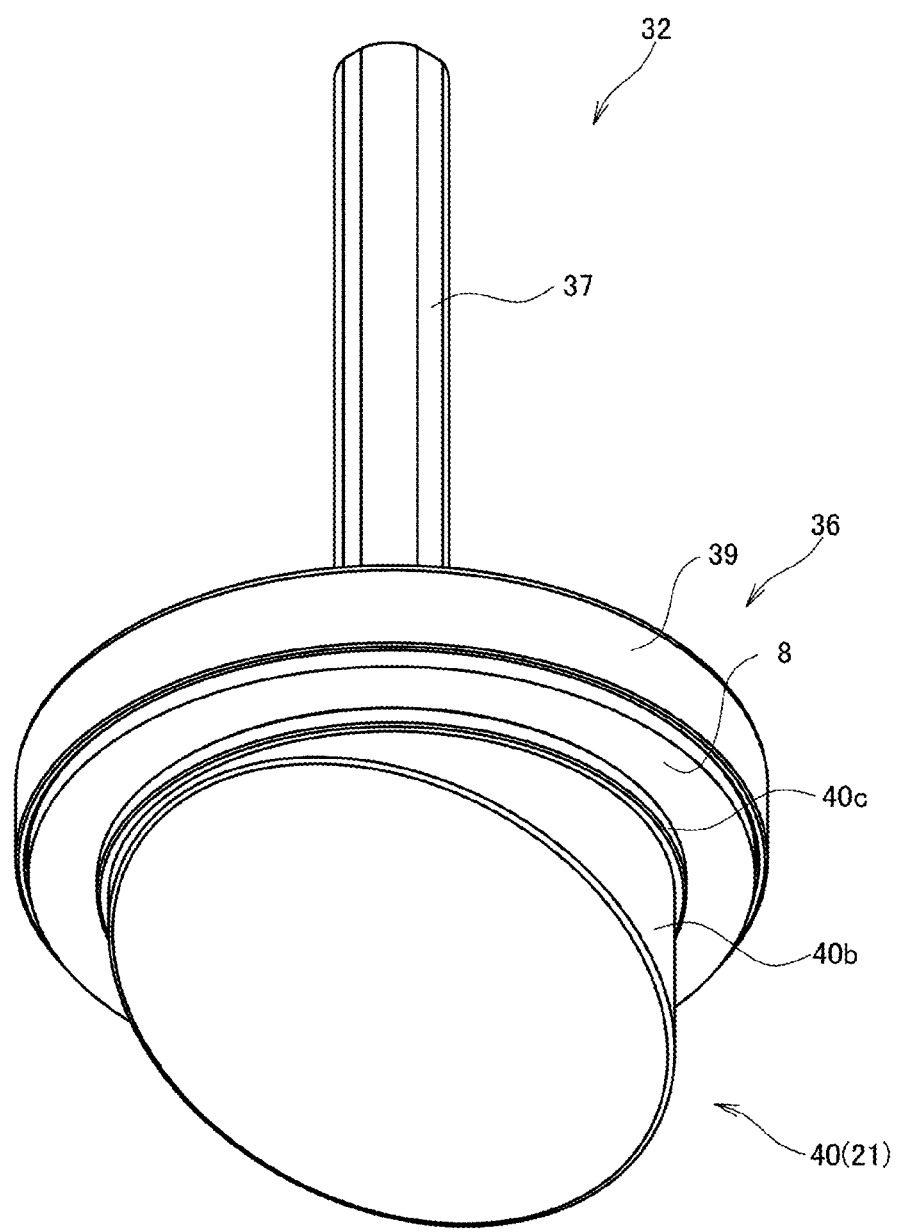
FIG. 9 is a perspective view showing the bottom side of a reciprocating body according to the second embodiment.
Figure 10:
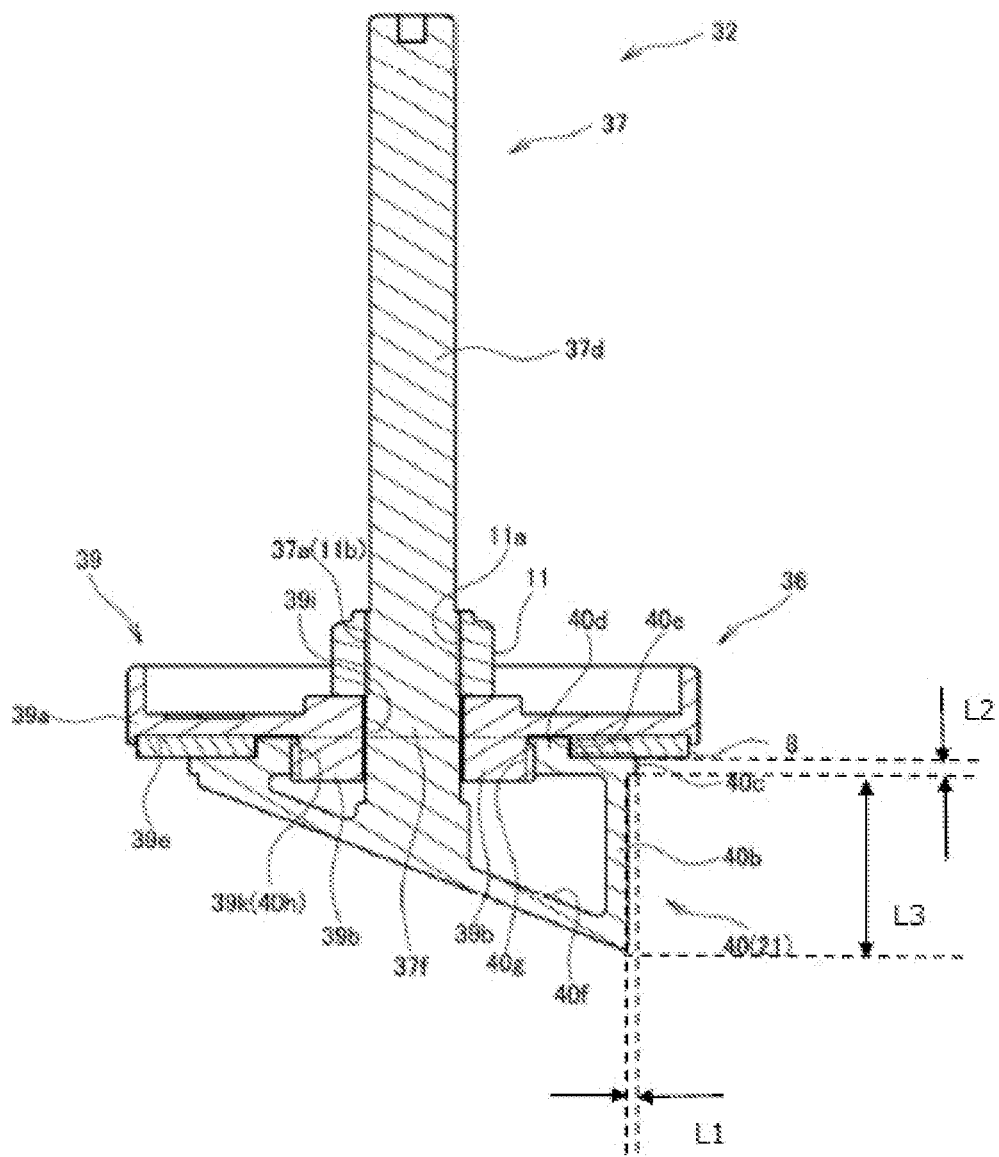
FIG. 10 is a longitudinal cross-sectional view of the reciprocating body according to the second embodiment.

Next, a check valve 1X according to a second embodiment will be described with reference to FIG. 8 to FIG. 10. The check valve 1X is mounted on a pipe having a larger diameter than the check valve 1. FIG. 8 is a longitudinal cross-sectional view showing the closed state of the check valve 1X according to the second embodiment of the present invention. FIG. 9 is a perspective view showing the bottom side of a reciprocating body 32 according to the second embodiment. FIG. 10 is a longitudinal cross-sectional view of the reciprocating body 32 according to the second embodiment.

Note that the description of the configuration of the check valve 1X in common with that of the check valve 1 according to the first embodiment will not be repeated. For example, a valve box, a packing 8 and a nut 11 of the check valve 1X are in common with those in the first embodiment except for the sizes and hence, the description of such members will not be repeated.

The check valve 1X mainly includes the reciprocating body 32, and a guide cap 33 having a guide cylinder 34 which guides the reciprocating body 32 such that the reciprocating body 32 is allowed to reciprocate. The reciprocating body 32 is mainly formed of a valve shaft 37 extending in a reciprocating direction, a valve element 36 provided to the lower end portion of the valve shaft 37, and the packing 8 mounted on the valve element 36.

The valve element 36 is formed of a deflecting portion 40 integrally formed with the end portion of the valve shaft 37 on the lower side (primary flow passage side), and a guide washer 39 which is mounted on the deflecting portion 40.

The valve shaft 37 has a small diameter portion 37d and a large diameter portion 37f in this order from the upper end toward the lower end which is connected to the deflecting portion 40.

The small diameter portion 37d is a part accommodated in the guide cylinder 34 described later.

The large diameter portion 37f is a part where the lower portion of the large diameter portion 37f is made to pass through an insertion hole 39i of the guide washer 39 described later. The large diameter portion 37f is provided in the vicinity of the lower end of the valve shaft 37. A threaded portion 37a is formed on the outer peripheral surface of a portion above the large diameter portion 37f. The threaded portion 37a is a part with which a threaded engagement portion (female threads) 11b of the nut 11 is threadedly engaged.

The guide washer 39 has a large diameter portion 39a and a small diameter portion 39b as shown in FIG. 10. On the outer peripheral surface of the small diameter portion 39b, a threaded portion 39k is formed which is threadedly engaged with a threaded engagement portion 40h of the deflecting portion 40 described later.

The guide washer 39 is, as shown in FIG. 10, mounted on the periphery of the lower end portion of the valve shaft 37, and includes the large diameter portion 39a on the upper side, and the small diameter portion 39b, formed concentrically with the large diameter portion 39a, on the lower side. At the center of the guide washer 39, the insertion hole 39i is formed to penetrate in the wall thickness direction. The insertion hole 39i is disposed at a part where the large diameter portion 37f of the valve shaft 37 is made to pass through in a state where the valve shaft 37 is mounted on the guide washer 39.

As shown in FIG. 9 and FIG. 10, at a part of an extending portion 21 (deflecting portion 40) which is allowed to come into contact with the primary flow passage side (lower surface) of the packing 8, a protrusion (protruding edge 40c) is formed which protrudes relative to surroundings in the direction intersecting with the axial direction of the valve shaft 37. Specifically, the protruding edge 40c is circularly formed to protrude from a side wall 40b of the deflecting portion 40 perpendicularly with respect to the axial direction of the valve shaft 37.

As described above, with the formation of the protruding edge 40c on the extending portion 21, the contact area between the extending portion 21 and the packing 8 is expanded and hence, the packing 8 can be easily kept on the upper side of the extending portion 21, and the volume of the extending portion 21 can be reduced, thus suppressing an increase in weight.

As shown in FIGS. 9 and 10, a first length L1 of the protrusion in the direction intersecting with the axial direction of the valve shaft is shorter than a third length L3 of the deflecting portion 40 in the axial direction. Also, a second length L2 of the protrusion in the axial direction of the valve shaft is shorter than the third length L3.

The base portion (the large diameter portion 39a of the guide washer 39) and the extending portion 21 (the lower portion of the valve shaft 37 and the deflecting portion 40) are integrally formed by assembling separate members (the deflecting portion 40 integrally formed with the valve shaft 37 and the guide washer 39). The extending portion 21 (deflecting portion 40) has a hollow portion 40f therein. At the part of the extending portion 21 (deflecting portion 40) which opposes the base portion (the large diameter portion 39a of the guide washer 39), an opening 40g communicating with the hollow portion 40f is formed which.

In the direction perpendicular to the axial direction of the valve shaft 37, the maximum diameter of the hollow portion 40f is formed larger than the opening 40g. The deflecting portion 40 including the hollow portion 40f is formed mirror symmetrically with respect to a virtual plane (longitudinal cross section in FIG. 10, and a surface which corresponds to virtual plane P in FIG. 1) including the deflection direction of a fluid and the axial direction of the valve shaft 37 in the plane.

Note that the base portion of the valve element 36 in this embodiment refers to a part where the large diameter portion 39a of the guide washer 39 is present, and is a part disposed above a two-dot chain line in FIG. 10. The extending portion 21 of the valve element 36 corresponds to a part which includes the small diameter portion 39b of the guide washer 39 and the deflecting portion 40, and which is disposed below the two-dot chain line in FIG. 10.

With the formation of the hollow portion 40f in the extending portion 21 (deflecting portion 40), the weight of the reciprocating body 32 can be reduced. The deflecting portion 40 including the hollow portion 40f is formed mirror symmetrically with respect to a virtual plane including the deflection direction and the axial direction of the valve shaft 37 in the plane. With such a configuration, when a fluid flows in the deflection direction, it is possible to suppress that the extending portion 21 is shifted by a force applied from the fluid to the extending portion 21 and hence, the flow of the fluid can be stabilized.

Further, on the inner peripheral surface of the deflecting portion 40 which forms the opening 40g, the threaded engagement portion (female threads) 40h is formed which is threadedly engaged with the threaded portion 39k of the small diameter portion 39b. That is, the deflecting portion 40 is mounted on the outer periphery of the small diameter portion 39b of the guide washer 39.

Further, on the upper side of the outer periphery of a part in which the opening 40g is formed, the deflecting portion 40 has a small diameter portion 40d formed with a smaller diameter than the protruding edge 40c disposed below the small diameter portion 40d.

The extending portion 21 (deflecting portion 40) has the protruding edge 40c having a large diameter and the small diameter portion 40d as described above. Accordingly, as schematically shown by a two-dot chain line in FIG. 10, the extending portion 21 has a recess 40e, which is a difference in length in the radial direction between the protruding edge 40c and the small diameter portion 40d, on the upper side. The recess 40e is, in the direction perpendicular to the axial direction of the valve shaft 37, formed to be recessed relative to the protruding edge 40c of the deflecting portion 40, and the portion of the packing 8 is fitted in the recess 40e. This recess 40e is formed such that the lower surface of the large diameter portion 39a and a part formed into an L shape in cross section by the upper surface of the protruding edge 40c, which is continuously formed from the peripheral surface of the small diameter portion 40d, are made to overlap with each other. It is sufficient to have the recess 40e to an extent that the packing 8 can be fitted. Accordingly, overlapping of the surfaces is not limited to overlapping where the surfaces are brought into close contact, and a slight gap may be present as shown in FIG. 10.

In addition, the recess 40e, which is recessed on the deflecting portion 40 in the radial direction, and a flange-side recessed portion 39e are spatially continuously formed. The outer diameter of an annular space formed by the recess 40e and the flange-side recessed portion 39e is formed larger than the outer diameter of the packing 8.

At the part of the guide cylinder 34 which accommodates the valve shaft 37, four through holes 34f are formed which penetrate in the direction intersecting with the axial direction of the valve shaft 37 on a plane which includes the deflection direction and a plane perpendicular to the plane. The guide cylinder 34 is a cylinder for intermediate flow rate. Accordingly, even when a pressing force applied from the valve shaft 37 to the inside of the guide cylinder 34 is larger than a pressing force applied from the valve shaft 7, due to the formation of the larger number of through holes 34f, a fluid can be easily released to the outside from the inside of the guide cylinder 34. Accordingly, the action relating to the reciprocation of the reciprocating body 32 can be smoothly performed.

Third Embodiment

Figure 11:
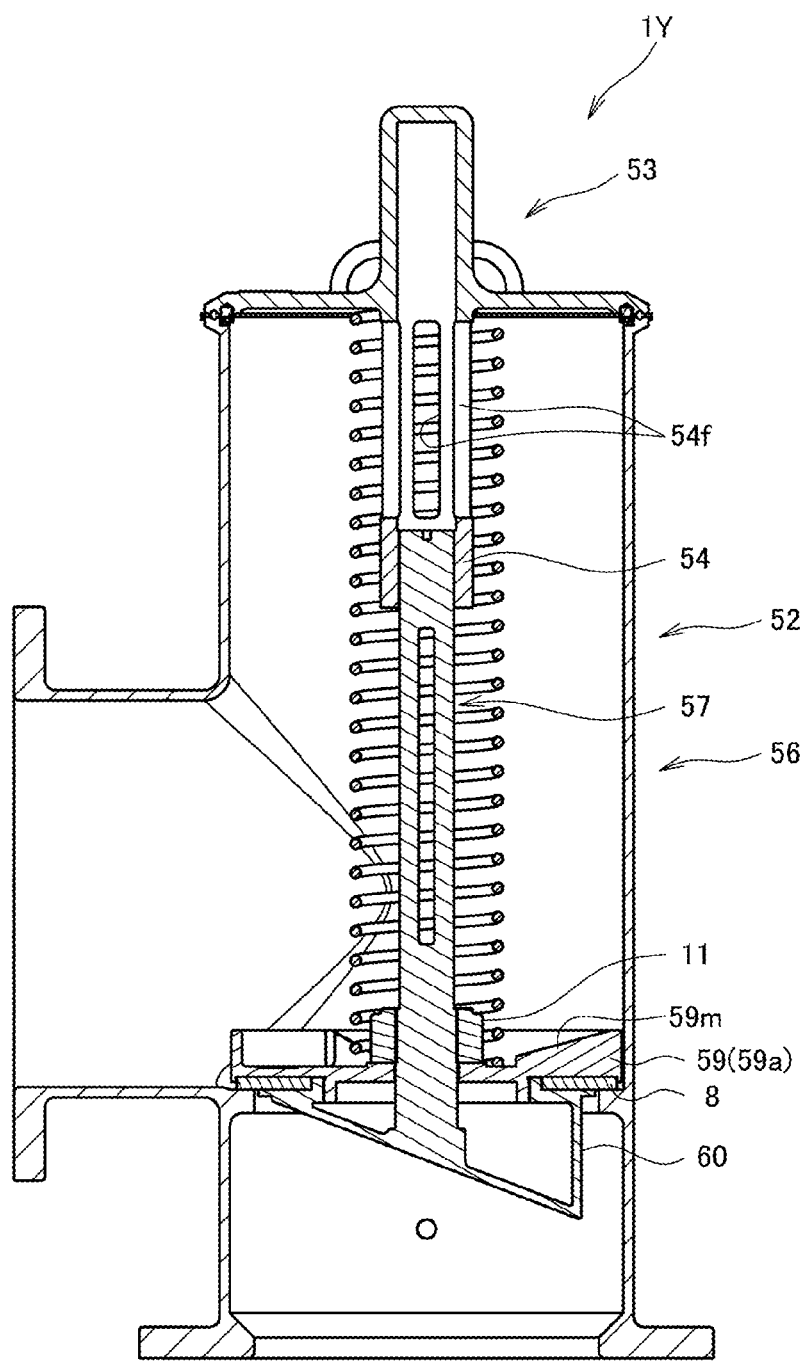
FIG. 11 is a longitudinal cross-sectional view showing a closed state of a check valve according to a third embodiment of the present invention.
Figure 12:
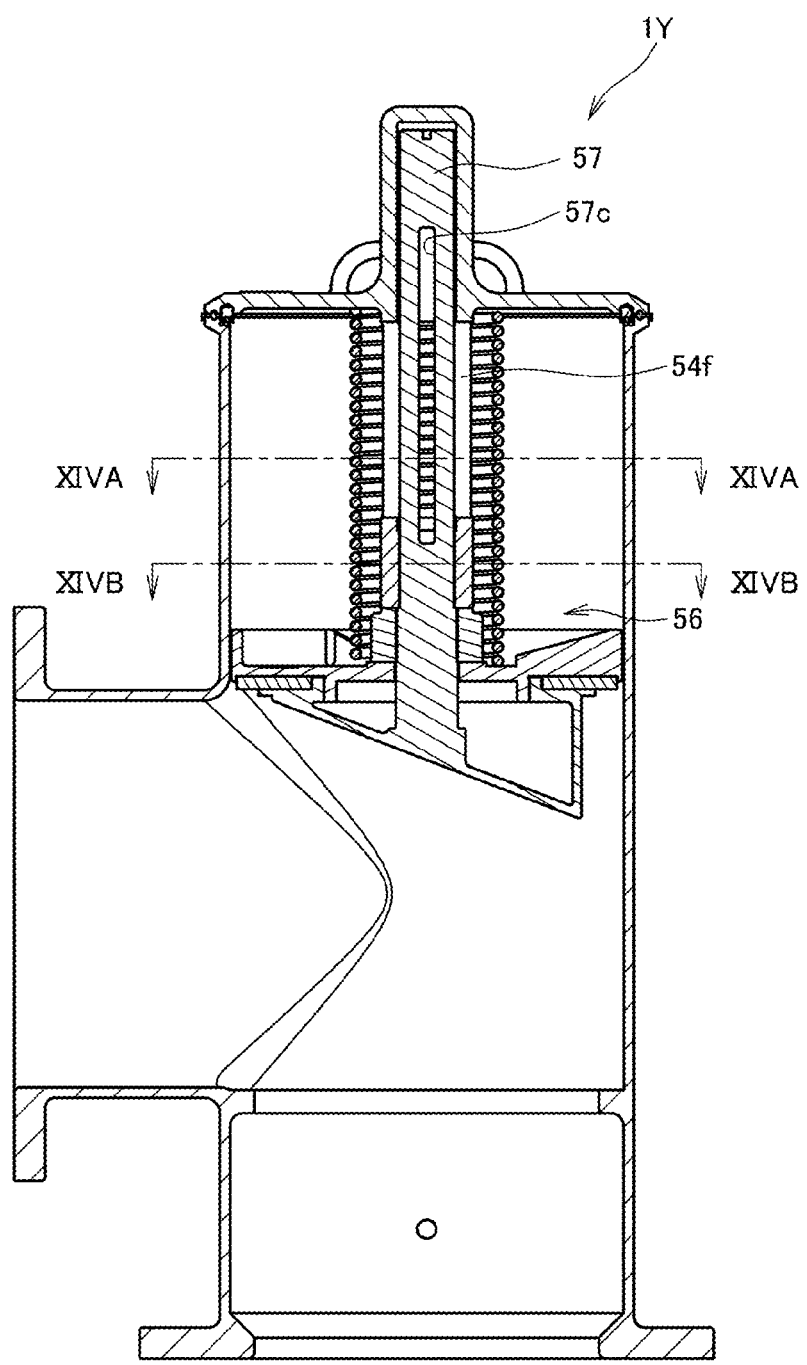
FIG. 12 is a longitudinal cross-sectional view showing an open state of the check valve according to the third embodiment.
Figure 13:
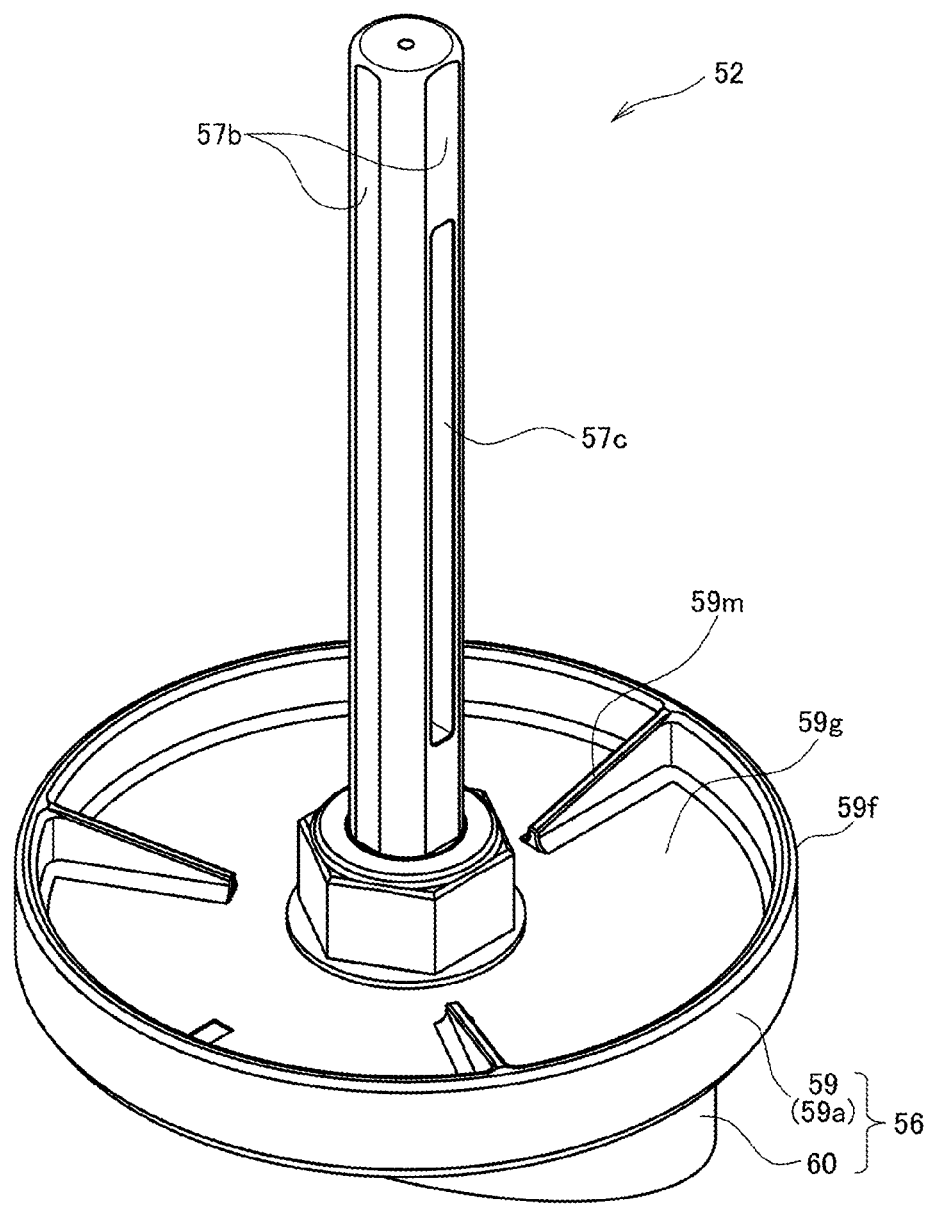
FIG. 13 is a perspective view showing the upper side of a reciprocating body which forms the check valve according to the third embodiment.
Figure 14A:
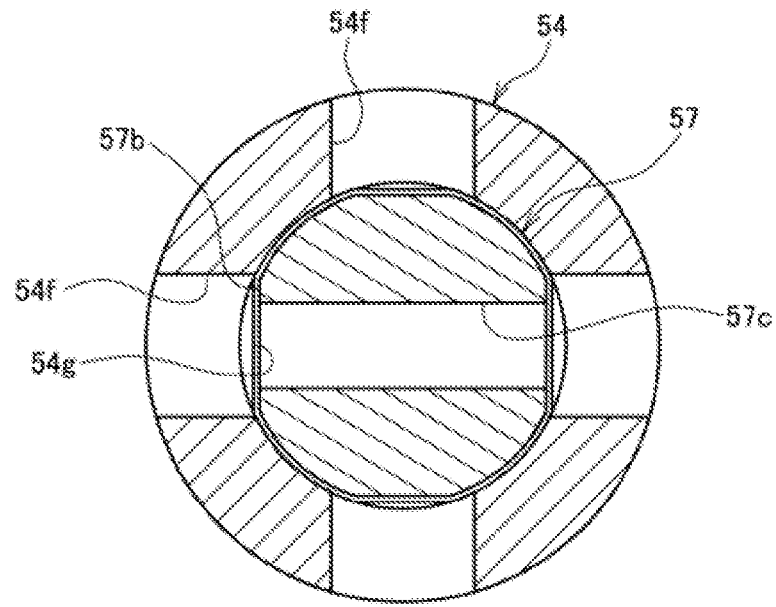
Figure 14B:
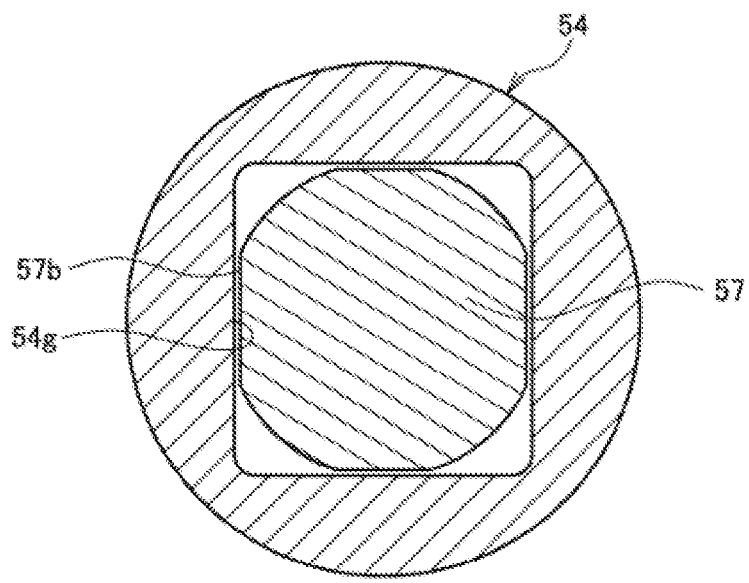

Next, a check valve 1Y according to a third embodiment will be described with reference to FIG. 11 to FIG. 14. The check valve 1Y is mounted on a pipe for high flow rate having a larger diameter than the check valve 1X mounted on a pipe for intermediate flow rate. FIG. 11 is a longitudinal cross-sectional view showing the closed state of the check valve 1Y according to the third embodiment of the present invention. FIG. 12 is a longitudinal cross-sectional view showing the open state of the check valve 1Y. FIG. 13 is a perspective view showing the upper side of a reciprocating body 52 which forms the check valve 1Y. FIG. 14 is a view showing a state where a guide cylinder 54 according to the third embodiment accommodates a valve shaft 57, wherein FIG. 14A is a cross-sectional view showing an XIVA-XIVA cross section in FIG. 12, and FIG. 14B is a cross-sectional view showing an XIVB-XIVB cross section in FIG. 12.

Note that the description of the configuration of the check valve 1Y in common with the check valve 1 according to the first embodiment or the check valve 1X according to the second embodiment will not be repeated. For example, a valve box, a packing 8 and a nut 11 of the check valve 1Y are in common with those in the first embodiment and the second embodiment except for the sizes and hence, the description of such members will not be repeated.

The check valve 1Y mainly includes the reciprocating body 52 and a guide cap 53 having the guide cylinder 54 which guides the reciprocating body 52 such that the reciprocating body 52 is allowed to reciprocate. The reciprocating body 52 is mainly formed of the valve shaft 57 extending in a reciprocating direction, a valve element 56 provided at the lower end portion of the valve shaft 57, and the packing 8 mounted on the valve element 56.

The valve element 56 is formed of a deflecting portion 60 integrally formed with the end portion of the valve shaft 57 on the lower side (primary flow passage side), and a guide washer 59 mounted on the deflecting portion 60.

In the valve shaft 57, as shown in FIG. 13 and FIG. 14, a through hole 57c is formed which penetrates in the direction intersecting with the axial direction of the valve shaft 57.

As describe above, the through hole 57c is formed in the valve shaft 57 so that a fluid is allowed to pass through the through hole 57c of the valve shaft 57 whereby the hydraulic pressure around the valve shaft 57 can be equalized. Accordingly, it is possible to suppress rattling of the reciprocating body 52 at the time of reciprocation of the reciprocating body 52, thus enabling the use of the check valve 1Y for a long period of time. That is, durability of the check valve 1Y can be increased. In addition, the weight of the valve shaft 57 can be reduced by an amount corresponding to the formation of the through hole 57c and hence, drag against water flow can be reduced, thus lowering the loss of head.

In particular, the through hole 57c penetrates in the direction perpendicular to a virtual plane (a longitudinal cross section in FIG. 12, and a surface which corresponds to the virtual plane P in FIG. 1) including the deflection direction in the plane.

As described above, with the formation of the through hole 57c, it is possible to suppress that a fluid passing through the through hole 57c of the valve shaft 57 affects the main stream of deflecting fluid.

First through holes (through holes 54f) are formed at a part of the guide cylinder 54 which accommodates the valve shaft 57. Assume the through hole 57c formed in the valve shaft 57 as described above as a second through hole. In such a case, the first through holes (through holes 54f) and the second through hole (through hole 57c) are formed so as to at least partially overlap with each other in a state where the portion of the valve shaft 57 is accommodated in the guide cylinder 54.

Specifically, the through hole 57c of the valve shaft 57 is formed longer than the through hole 54f of the guide cylinder 54 in the axial direction. In the state where the valve shaft 57 is moved upward so as to open the valve element 56 by an amount equal to or more than the predetermined amount, the through holes 54f overlap with the portion of the through hole 57c.

With such a configuration, also in the state where the portion of the valve shaft 57 is accommodated in the guide cylinder 54, it is possible to allow a fluid to pass through the valve shaft 57 and the guide cylinder 54 through the through holes 54f and the through hole 57c and hence, the hydraulic pressure around the guide cylinder 54 can be equalized. Accordingly, in the same manner as the above, it is possible to suppress rattling of the reciprocating body 52 at the time of reciprocation of the reciprocating body 52 so that durability of the check valve 1Y can be increased.

As shown in FIG. 14A, in the direction perpendicular to the axial direction, the width of the first through hole (through hole 54f) is larger than the width of the second through hole (through hole 57c).

The width of the through hole 54f is larger than the width of the through hole 57c. Accordingly, over the entire width of the through hole 54f, a fluid passing through the through holes 57c is caused to pass through the through hole 54f so that the hydraulic pressure around the guide cylinder 54 can be equalized. Accordingly, in the same manner as the above, it is possible to suppress rattling of the reciprocating body 52 at the time of reciprocation of the reciprocating body 52 so that durability of the check valve 1Y can be increased.

As shown in FIG. 14B, at the respective parts of the outer peripheral surface of the valve shaft 57 and the inner peripheral surface of the guide cylinder 54 which oppose each other in a state where the guide cylinder 54 accommodates the valve shaft 57, planar portions 54g, 57b extending in the axial direction of the valve shaft 57 are respectively formed. That is, the planar portions 54g and the planar portions 57b are arranged parallel (including substantially parallel) to each other.

With such a configuration, when the valve shaft 57 is accommodated in the guide cylinder 54, the planar portions 57b, which are present on the outer peripheral surface of the valve shaft 57, and the planar portions 54g, which are present on the inner peripheral surface of the guide cylinder 54, are disposed at positions which oppose each other and hence, it is possible to suppress that the valve shaft 57 rotates with respect to the guide cylinder 54. Accordingly, it is possible to suppress that the position of the through hole 57c is displaced from the direction perpendicular to a virtual plane including the deflection direction in the plane.

As shown in FIG. 13, at a position inside of an upper peripheral edge portion 59f in the radial direction on the surface (upper surface) of the base portion (a large diameter portion 59a of the guide washer 59) on the other side, a the-other-side recessed portion (upper recessed portion 59g) is formed which is recessed downward (toward the primary flow passage side) more than the upper peripheral edge portion 59f. On the upper recessed portion 59g, ribs 59m, having a triangular shape as viewed in a side view, are formed which are connected to the inner side surface of the upper peripheral edge portion 59f within a range from the top to the bottom. With the formation of the ribs 59m as described above, it is possible to increase rigidity of the guide washer 59 which is lowered due to the formation of the upper recessed portion 59g.

The locking member (nut 11) is configured to come into contact with the guide cylinder 54 in a state where the reciprocating body 52 is in a fully-open position. The nut 11 comes into contact with the guide cylinder 54 as described above and hence, the upper limit position of the reciprocating body 52 in a fully-open state can be determined.

<Dynamic Pressure Distribution>

Figure 15:
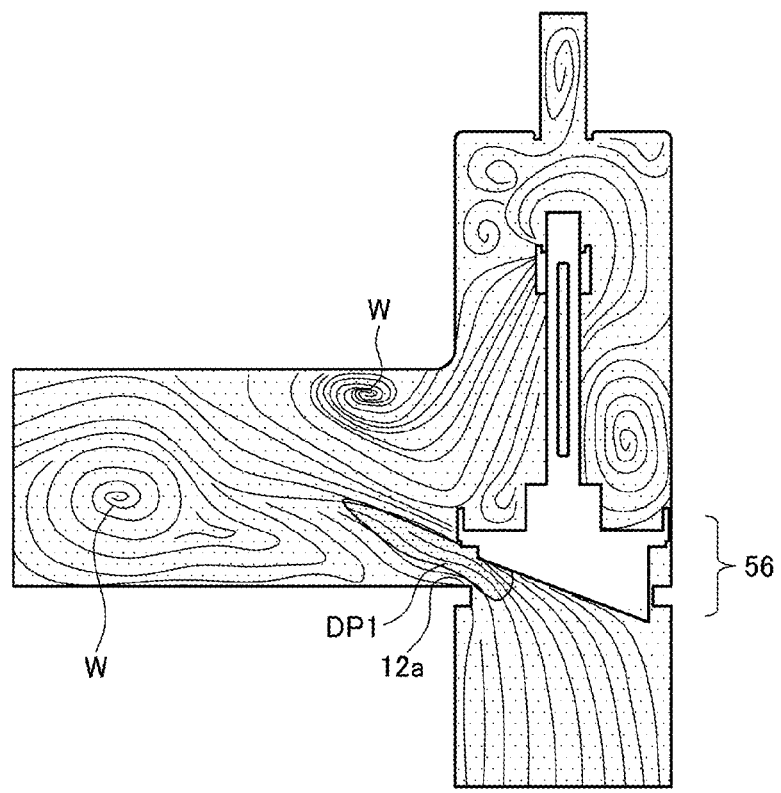
FIG. 15 is a view showing the flow of a fluid and dynamic pressure distribution at a flow rate of 4600 L/min.
Figure 16:
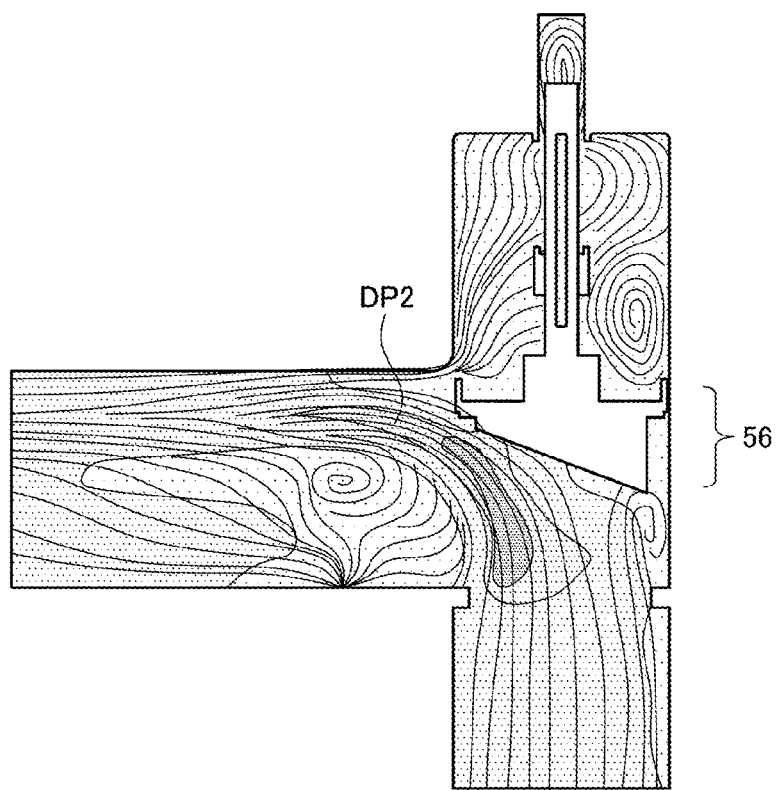
FIG. 16 is a view showing the flow of the fluid and dynamic pressure distribution at a flow rate of 15400 L/min.
Figure 17:
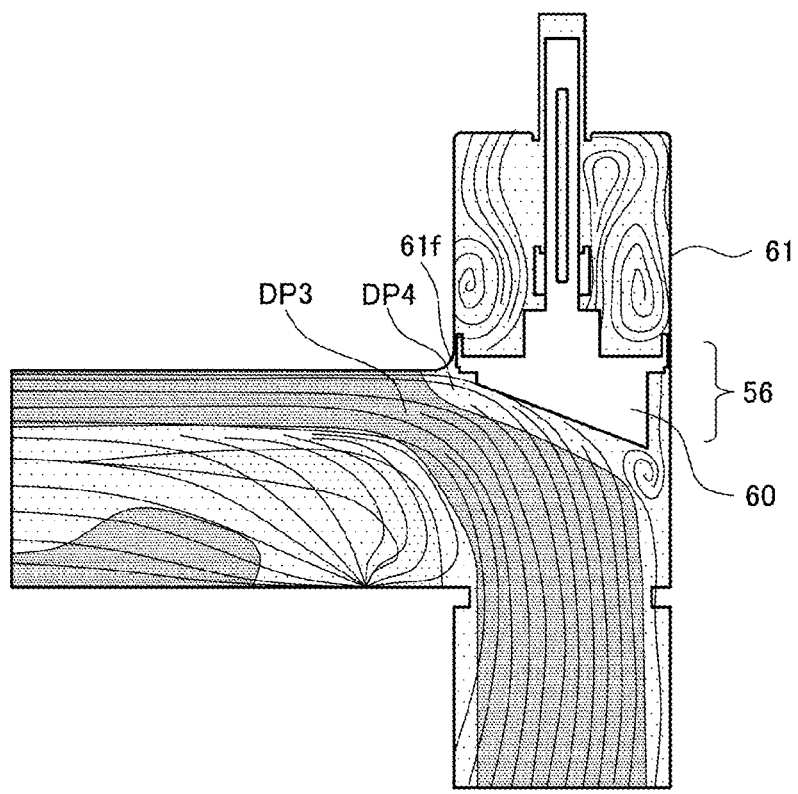
FIG. 17 is a view showing the flow of the fluid and dynamic pressure distribution at a flow rate of 19000 L/min.

Next, dynamic pressure distributions at respective flow rates when fluid is caused to flow through the check valve 1Y will be described with reference to FIG. 15 to FIG. 17. FIG. 15 is a view showing the flow of fluid and dynamic pressure distribution at a flow rate of 4600 L/min (the degree of opening of the valve 21.9%). FIG. 16 is a view showing the flow of fluid and dynamic pressure distribution at a flow rate of 15400 L/min (the degree of opening of the valve 73.4%). FIG. 17 is a view showing the flow of fluid and dynamic pressure distribution at a flow rate of 19000 L/min (the degree of opening of the valve 100%). Note that in FIG. 15 to FIG. 17, darker color (the larger amount of dots) indicates higher dynamic pressure.

As shown in FIG. 15, with respect to the flow rate of 4600 L/min (the degree of opening of the valve 21.9%), a dynamic pressure DP1 reduces after a fluid passes through between the valve seat 12a and the packing 8 of the valve element 56. After the fluid passes through between the valve seat 12a and the packing 8 from the primary flow passage side, the flow passage rapidly expands in the secondary flow passage. Accordingly, the main stream of the fluid is diffused and peeled so that a pressure loss is increased. Further, the fluid which passes through between the valve seat 12a and the packing 8 forms the flow having a narrow width at an initial stage of the passing action. A vortex W is generated on both sides of the flow and hence, a pressure loss is increased.

As shown in FIG. 16, with respect to the flow rate of 15400 L/min (the degree of opening of the valve 73.4%), a dynamic pressure DP2 reduces after a fluid passes through between the valve seat 12a and the packing 8 from the primary flow passage side. However, the reduction rate of the dynamic pressure DP2 is suppressed at a low level compared with the reduction rate of the dynamic pressure DP1. With the above-mentioned degree of opening of the valve, the amount of expansion of the flow passage in the secondary flow passage becomes small after a fluid passes through between the valve seat 12a and the packing 8 from the primary flow passage side. Accordingly, diffusion and peeling of the main stream of the fluid are suppressed so that a pressure loss is reduced. Further, with the above-mentioned degree of opening of the valve, a fluid which passes through between the valve seat 12a and the packing 8 forms the flow having a relatively large width at the initial stage of a passing action. Accordingly, the generation of a large vortex W can be suppressed and hence, a pressure loss can be suppressed at a low level.

As shown in FIG. 17, with respect to the flow rate of 19000 L/min (the degree of opening of the valve 100%), a dynamic pressure DP3 is not substantially lowered after a fluid passes through between the valve seat 12a and the packing 8 from the primary flow passage side. However, a dynamic pressure DP4 in the vicinity of the deflecting portion 60 is lowered compared with the dynamic pressure DP3. The reason is as follows. With the more amount of a corner 61f of the inner wall of a valve box 61 exposed to the flow passage for fluid, the deflecting portion 60 is elevated more and hence, the more amount of fluid impinges on the corner 61f. Accordingly, peeling occurs on the fluid which impinges on the corner 61f so that the dynamic pressure DP3 is lower than the dynamic pressure DP4, thus causing a relatively high pressure loss.

By setting and selecting elasticity of the spring body 20 and the weight of the reciprocating body 52 corresponding to the flow rate of a fluid which flows through the valve element 56, the degree of opening of the valve is caused to fall within an appropriate range, thus suppressing a pressure loss at a low level.

Fourth Embodiment

Figure 18:
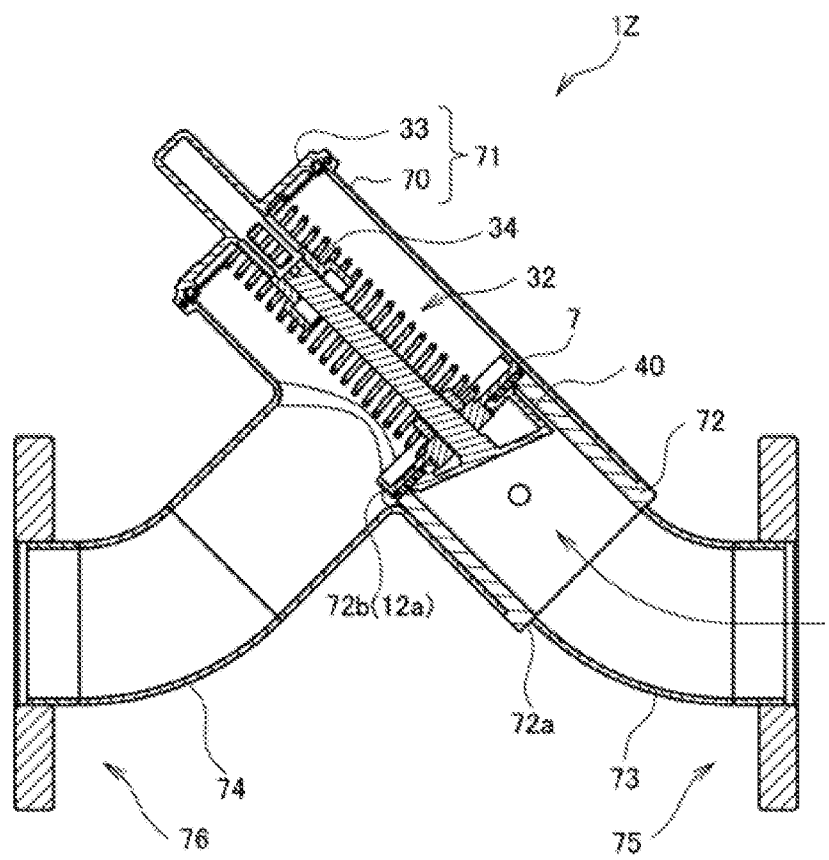
FIG. 18 is a longitudinal cross-sectional view showing a closed state of a check valve according to a fourth embodiment.

Next, a check valve 1Z according to a fourth embodiment will be described with reference to FIG. 18. FIG. 18 is a longitudinal cross-sectional view showing the closed state of the check valve 1Z according to the fourth embodiment. An arrow shown in FIG. 18 indicates the direction of the flow of a fluid.

The check valve 1Z is configured to be mounted in a gap between two pipes linearly arranged. The configuration of a member accommodated in a valve box 70 of the check valve 1Z according to this embodiment is substantially equal to the internal configuration of the check valve 1X and hence, the description of the member will not be repeated.

The check valve 1Z is mainly formed of a tee pipe fitting 71 having the valve box 70, an inflow valve cylinder 72, an elbow 73 mounted on the inflow valve cylinder 72, an elbow 74 mounted on the tee pipe fitting 71 on the side where the fluid flows out, and flange members 75, 76 mounted on end portions of elbows 73, 74.

The tee pipe fitting 71 is formed into a T shape. At a linearly extending part of the tee pipe fitting 71, a reciprocating body 32, which is allowed to reciprocate parallel to the extending direction of the linearly extending part, is disposed, and a guide cap 33 having a guide cylinder 34 extending in the extending direction and other members are disposed.

The inflow valve cylinder 72 is formed into a circular cylindrical shape, and is fixed along the inner peripheral surface of the tee pipe fitting 71 on the primary flow passage side. An inner end surface 72b of the inflow valve cylinder 72 which is positioned in the tee pipe fitting 71 functions as a valve seat 12a.

One end of the elbow 73 is joined to an outer end surface 72a of the inflow valve cylinder 72 by welding, and the other end of the elbow 73 is joined to the flange member 75 by welding.

One end of the elbow 74 is joined to the outflow side of the tee pipe fitting 71 by welding, and the other end of the elbow 74 is joined to the flange member 76 by welding.

The flange member 75 and the flange member 76 are fixed to pipes (not shown in the drawing) using fasteners (not shown in the drawing), such as bolts and nuts.

Each of the elbow 73 and the elbow 74 has a bent portion at least at a portion thereof in the pipe length. This embodiment exemplifies a mode where each of the elbow 73 and the elbow 74 is substantially formed only of a bent portion. However, the elbow 73 and the elbow 74 are not limited to such a configuration, and the elbow 73 and/or the elbow 74 may have a linear portion at the portion thereof in the pipe length. The pipe lengths of the elbow 73 and the elbow 74 refer to lengths of the elbow 73 and the elbow 74 on the axes thereof.

As shown in FIG. 18, a fluid which flows in from the flange member 75 flows while being bent along the elbow 73, and smoothly flows into the inflow valve cylinder 72 from the elbow 73 and pushes up the reciprocating body 32. The fluid which is deflected by the deflecting portion 40 smoothly flows into the elbow 74 from the secondary flow passage of the tee pipe fitting 71. Then, the fluid flows while being bent along the elbow 74, and flows out from the flange member 76.

In this embodiment, the inflow direction of the flange member 75 and the outflow direction of the flange member 76 are coaxial with each other. That is, the check valve 1Z in this embodiment is of a straight type. In other words, the elbow 73 and the elbow 74 are connected to the tee pipe fitting 71 where a primary flow passage and a secondary flow passage are disposed orthogonal to each other, thus having a function of angle-type check valve and the internal configuration of the tee pipe fitting 71 so that the check valve 1Z of a straight type is formed.

The angle, the size, or the length of the elbows 73, 74 may be desirably set corresponding to the arrangement and the size of a pipe to be mounted.

The check valve 1Z according to this embodiment has been described as a member which is formed by joining the tee pipe fitting 71, the inflow valve cylinder 72, the elbow 73, the elbow 74, and the flange members 75, 76. However, the present invention is not limited to such a configuration. For example, the check valve 1Z may be a member where at least a portion is integrally formed by lost wax process or other method, such as casting.

Modification

Figure 19:
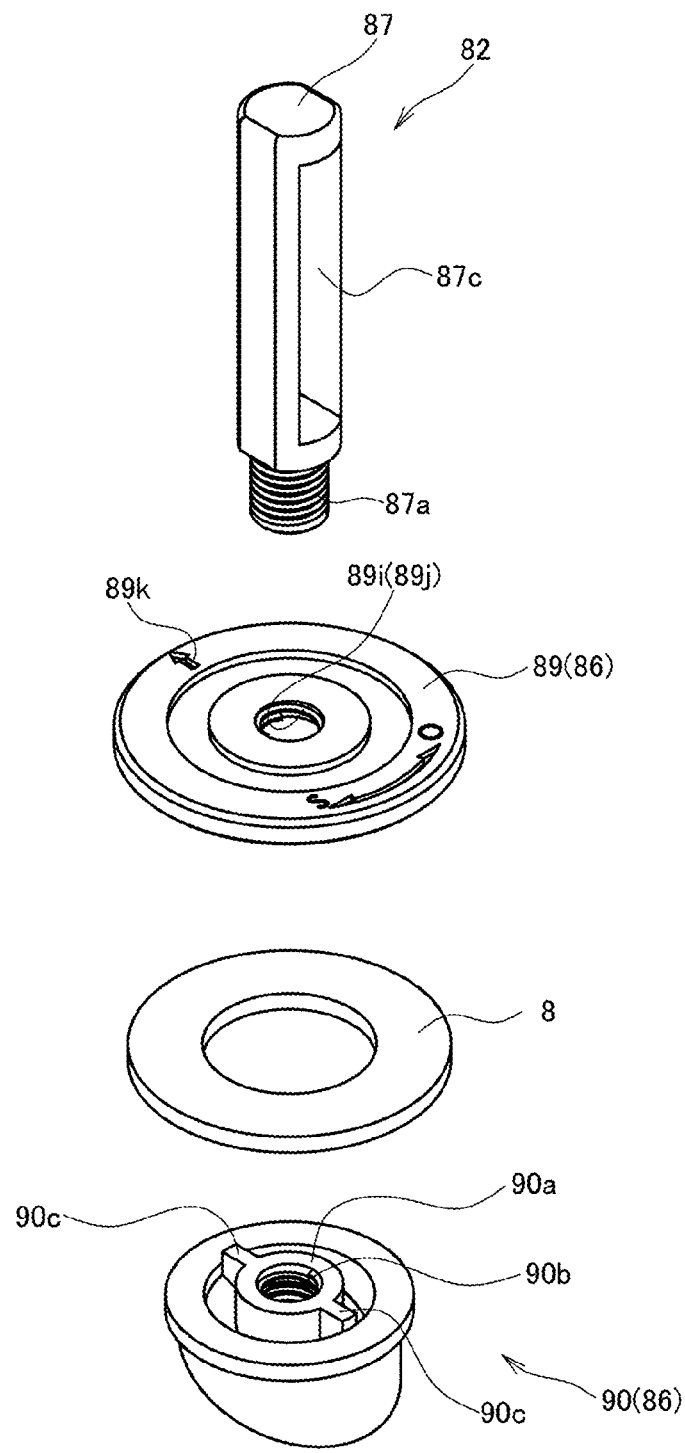
FIG. 19 is an exploded perspective view showing a reciprocating body according to a modification.

The reciprocating body in the above-mentioned embodiments has been described as a member where the valve shaft and the deflecting portion are integrally formed. However, the present invention is not limited to such a configuration. Next, a reciprocating body 82 according to the modification will be described with reference to FIG. 19. FIG. 19 is an exploded perspective view showing the reciprocating body 82 according to the modification.

The reciprocating body 82 is formed of a valve shaft 87, a valve element 86, which is formed of a guide washer 89 and a deflecting portion 90, and a packing 8 which is sandwiched by the guide washer 89 and the deflecting portion 90.

The valve shaft 87 has a threaded portion 87a at the outer peripheral portion of the lower end portion of the valve shaft 87. A through hole 87c is formed in side surfaces of the valve shaft 87 in a penetrating manner.

The guide washer 89 has an insertion hole 89i, which penetrates in the thickness direction, at the center portion, and a threaded engagement portion 89j, which is formed of female threads, is formed on the inner surface of the insertion hole 89i. Further, a direction indicating groove 89k which indicates the deflection direction by an arrow is formed on the upper surface of the guide washer 89.

With the formation of the threaded engagement portion 89j as described above, the valve shaft 87 and the guide washer 89 can be threadedly engaged with each other by a predetermined screwing amount. For example, such a screwing amount is an amount where a direction indicated by the direction indicating groove 89k points a direction perpendicular to the direction along which the through hole 87c penetrates as viewed in a plan view.

The deflecting portion 90 is formed such that a center portion 90a protrudes upward on the upper surface of the deflecting portion 90, and the center portion 90a has a threaded engagement portion 90b which is a screw hole having female threads. Two ribs 90c are formed to extend in the radial direction of the center portion 90a.

The reciprocating body 82 is assembled such that the threaded portion 87a is threadedly engaged with the threaded engagement portion 90b of the deflecting portion 90 in a state where the threaded portion 87a of the valve shaft 87 is threadedly engaged with the threaded engagement portion 89j of the guide washer 89, and the packing 8 is disposed between the guide washer 89 and the deflecting portion 90.

Although the respective embodiments have been described heretofore with reference to drawings, these embodiments merely form examples of the present invention, and various configurations other than the above may also be adopted.

It is not always necessary that the check valve of the present invention and respective constitutional elements of the reciprocating member forming the check valve are individually independent members. It is allowed that a plurality of constitutional elements are formed as one member, one constitutional element is formed of a plurality of members, a certain constitutional element forms a portion of another constitutional element, a portion of a certain constitutional element and a portion of another constitutional element are the same portion and the like.

This embodiment includes the following technical concept.

(1) A lift type check valve comprising:
 a valve seat;
 a reciprocating body which is allowed to linearly reciprocate between a closed position, where the reciprocating body is brought into close contact with the valve seat, and an open position, where the reciprocating body is away from the valve seat;
 a primary flow passage which is positioned on an upstream side of the reciprocating body;
 a secondary flow passage which is positioned on a downstream side of the reciprocating body, and which intersects with the primary flow passage; and
 a guide cylinder which guides the reciprocating body such that the reciprocating body is allowed to reciprocate, wherein
 the reciprocating body includes:
 a valve element including a deflecting surface which causes a fluid to be deflected from the primary flow passage side to the secondary flow passage side in a state where the reciprocating body is in the open position,
 a valve shaft extending from the valve element, and guided by the guide cylinder so as to allow the reciprocating body to reciprocate, and
 a packing having an annular shape which is made of a material softer than the valve element, and which is circularly brought into close contact with the valve seat in a state where the reciprocating body is in the closed position,
 assuming the primary flow passage side as one side, the valve element includes a base portion disposed on the other side, which is a side opposite to the one side, and an extending portion extending toward the one side from the base portion,
 the base portion has, on the primary flow passage side, a flange surface which supports the packing in a state where the packing is exposed to the primary flow passage side,
 the flange surface is formed larger than the extending portion in a direction perpendicular to an axial direction of the valve shaft, and is formed such that the flange surface is allowed to come into contact with the valve seat via the packing,
 on an outer periphery of the extending portion, a recess is formed which is recessed relative to other parts in the direction perpendicular to the axial direction of the valve shaft, and a portion of the packing is fitted in the recess.

(2) The check valve according to (1), wherein
 the packing is sandwiched between a surface of the base portion on the primary flow passage side and a portion of the extending portion, and the base portion and the extending portion are formed by assembling separate members.

(3) The check valve according to (2), wherein
 the separate members are threadedly engaged with each other so that the packing is sandwiched between the separate members.

(4) The check valve according to (3), further comprising a locking member which presses the base portion toward the extending portion side from the other side, wherein
 the base portion has a first insertion hole allowing insertion of the valve shaft,
 the valve shaft has a threaded portion on an outer peripheral surface at a portion on the other side of the base portion, and
 the locking member has a second insertion hole allowing insertion of the valve shaft, and has a threaded engagement portion, which is threadedly engaged with the threaded portion, on an inner peripheral surface of the second insertion hole.

(5) The check valve according to (4), wherein
 the locking member comes into contact with the guide cylinder in a state where the reciprocating body is in a fully-open position.

(6) The check valve according to (5), wherein
 an accommodating recessed portion, which accommodates the locking member, is formed on the guide cylinder, and
 the locking member comes into contact with an accommodation bottom surface of the accommodating recessed portion in a state where the reciprocating body is in a fully-open position.

(7) The check valve according to any one of (2) to (6), wherein
 a flange-side recessed portion is formed on the flange surface of the base portion,
 in a direction perpendicular to the valve shaft, the flange-side recessed portion is formed with a size which allows the flange-side recessed portion to overlap with the valve seat, and
 at least a portion of the packing is accommodated in the flange-side recessed portion.

(8) The check valve according to any one of (1) to (7), further comprising:
 a valve box which has the valve seat and accommodates the reciprocating body;
 a cap which has the guide cylinder and is mounted on the valve box; and
 a biasing member which is provided between the valve element and the cap to bias the valve element toward the primary flow passage side, wherein the guide cylinder has a standing wall which protrudes from a peripheral edge of the guide cylinder toward the valve element side, and the standing wall is formed at a position which separates, in the direction perpendicular to the axial direction of the valve shaft, an inlet of the guide cylinder, which accommodates the valve shaft, and the biasing member.

(9) The check valve according to any one of (1) to (8), wherein at a part of the guide cylinder which accommodates the valve shaft, a through hole is formed which penetrates in a direction intersecting with the axial direction of the valve shaft.

(10) The check valve according to any one of (1) to (9), wherein in the valve shaft, a through hole is formed which penetrates in the direction intersecting with the axial direction of the valve shaft.

(11) The check valve according to (10), wherein a first through hole is formed at the part of the guide cylinder which accommodates the valve shaft, the through hole formed in the valve shaft is a second through hole, and the first through hole and the second through hole are formed so as to at least partially overlap with each other in a state where a portion of the valve shaft is accommodated in the guide cylinder.

(12) The check valve according to (11), wherein in a direction perpendicular to the axial direction, a width of the first through hole is larger than a width of the second through hole.

(13) The check valve according to any one of (1) to (12), wherein in the valve shaft, a through hole is formed which penetrates in a direction perpendicular to a virtual plane including a deflection direction in the plane.

(14) The check valve according to any one of (1) to (13), wherein at a part of the extending portion which is allowed to come into contact with a primary flow passage side of the packing, a protrusion is formed which protrudes relative to surroundings in the direction intersecting with the axial direction of the valve shaft.

(15) The check valve according to any one of (1) to (14), wherein at respective parts of the outer peripheral surface of the valve shaft and an inner peripheral surface of the guide cylinder which oppose each other in a state where the guide cylinder accommodates the valve shaft, planar portions extending in the axial direction of the valve shaft are respectively formed, and are arranged parallel to each other.

(16) The check valve according to any one of (1) to (15), wherein the base portion and the extending portion are integrally formed by assembling separate members, the extending portion has a hollow portion, at a part of the extending portion which opposes the base portion, an opening communicating with the hollow portion is formed, a maximum diameter of the hollow portion is formed larger than the opening in the direction perpendicular to the axial direction of the valve shaft, and the extending portion including the hollow portion is formed mirror symmetrically with respect to a virtual plane including the deflection direction of the fluid and the axial direction of the valve shaft in the plane.

(17) The check valve according to any one of (1) to (16), further comprising a valve box which has the valve seat and accommodates the reciprocating body, wherein the base portion has a peripheral edge portion which is formed to protrude more toward a distal end side of the valve shaft than other parts, and the peripheral edge portion is formed along an inner wall of the valve box.

(18) The check valve according to (17), wherein on a surface of the base portion on the other side, a the-other-side recessed portion which is recessed relative to the peripheral edge portion is formed, and a rib is formed on the the-other-side recessed portion.

(19) The check valve according to (11), wherein the second through hole is longer than the first through hole in the axial direction of the valve shaft.

(20) A reciprocating body for a check valve, used in a lift type check valve which includes:

a valve seat;

a reciprocating body which is allowed to linearly reciprocate between a closed position, where the reciprocating body is brought into close contact with the valve seat, and an open position, where the reciprocating body is away from the valve seat;

a primary flow passage which is positioned on an upstream side of the reciprocating body;

a secondary flow passage which is positioned on a downstream side of the reciprocating body, and which intersects with the primary flow passage; and a guide cylinder which guides the reciprocating body such that the reciprocating body is allowed to reciprocate, the reciprocating body comprising:

a valve element including a deflecting surface which causes a fluid to be deflected from the primary flow passage side to the secondary flow passage side in a state where the reciprocating body is in the open position;

a valve shaft extending from the valve element, and guided by the guide cylinder so as to allow the reciprocating body to reciprocate; and a packing having an annular shape which is made of a material softer than the valve element, and which is circularly brought into close contact with the valve seat in a state where the reciprocating body is in the closed position, wherein assuming the primary flow passage side as one side, the valve element includes a base portion disposed on the other side, which is a side opposite to the one side, and an extending portion extending toward the one side from the base portion, the base portion has, on the primary flow passage side, a flange surface which supports the packing in a state where the packing is exposed to the primary flow passage side, the flange surface is formed larger than the extending portion in a direction perpendicular to an axial direction of the valve shaft, and is formed such that at least a portion of the flange surface is allowed to come into contact with the valve seat via the packing, on an outer periphery of the extending portion, a recess is formed which is recessed relative to other parts in the direction perpendicular to the axial direction of the valve shaft, and a portion of the packing is fitted in the recess.

This application claims priority based on Japanese patent application No. 2018-044510 filed on Mar. 12, 2018, and the entire disclosure of which is incorporated herein by reference.

REFERENCE SIGNS LIST 1, 1X, 1Y, 1Z check valve
2 reciprocating body
3 guide cap (cap)
    4 guide cylinder
        4a large diameter portion
        4b standing wall
        4c accommodation bottom surface
        4d inlet
        4e accommodating recessed portion
        4f through hole
        4g planar portion
    5 top plate portion
        5a boss
        5b mounting hole
        5c setscrew
        5e ferrule flange
        5f seat surface
6 valve element
    7 valve shaft
        7a threaded portion
        7b planar portion
        7d small diameter portion
        7e intermediate diameter portion
        7f large diameter portion
        7g threaded portion
        7h relief hole
    8 packing
        8a center hole
    9 guide washer
        9a large diameter portion (base portion)
        9b small diameter portion (extending portion)
        9c recess
        9d bottom-side peripheral edge portion
        9e flange-side recessed portion
        9f upper peripheral edge portion (peripheral edge portion)
        9g upper recessed portion
        9h spring seat surface
        9i insertion hole (first insertion hole)
        9j threaded engagement portion
        9k insertion hole (first insertion hole)
        9m flange surface
    10 deflecting portion
        10a deflecting surface
    11 nut (locking member)
        11a insertion hole (second insertion hole)
        11b threaded engagement portion
12 valve box
    12a valve seat
    12b inner wall
    12c inflow passage (primary flow passage)
    12d outflow passage (secondary flow passage)
    12e ferrule flange
13, 14 flange portion
15 mounting base
    15a pressure reducing port
16 gasket
20 spring body
21 extending portion
32 reciprocating body
33 guide cap
    34 guide cylinder
        34f through hole
    36 valve element
    37 valve shaft
        37a threaded portion
        37d small diameter portion
        37f large diameter portion
    39 guide washer
        39a large diameter portion (base portion)
        39b small diameter portion
        39e flange-side recessed portion
        39i insertion hole
        39k threaded portion
    40 deflecting portion (extending portion)
        40b side wall
        40c protruding edge (protrusion)
        40d small diameter portion
        40e recess
        40f hollow portion
        40g opening
        40h threaded engagement portion
52 reciprocating body
    53 guide cap
        54 guide cylinder
        54f through hole (first through hole)
        54g planar portion
56 valve element
    57 valve shaft
        57b planar portion
        57c through hole (second through hole)
    59 guide washer
        59a large diameter portion (base portion)
        59f upper peripheral edge portion (peripheral edge portion)
        59g upper recessed portion (the-other-side recessed portion)
        59m rib
    60 deflecting portion
    61 valve box
        61f corner
70 valve box
71 tee pipe fitting
    72 inflow valve cylinder
        72a outer end surface
        72b inner end surface (valve seat)
73, 74 elbow
75, 76 flange member
82 reciprocating body
86 valve element
    87 valve shaft
        87a threaded portion
        87c through hole
    89 guide washer
        89i insertion hole
        89j threaded engagement portion
        89k direction indicating groove
90 deflecting portion
    90a center portion
    90b threaded engagement portion
    90c rib
DP1, DP2, DP3, DP4 dynamic pressure
P virtual plane
W vortex

The invention claimed is:
1. A lift type check valve comprising:
a valve seat;
a reciprocating body which is allowed to linearly reciprocate between a closed position, where the reciprocating body is brought into close contact with the valve seat, and an open position, where the reciprocating body is away from the valve seat;

a primary flow passage which is positioned on an upstream side of the reciprocating body;

a secondary flow passage which is positioned on a downstream side of the reciprocating body, and which intersects with the primary flow passage at the valve seat; and a guide cylinder which guides the reciprocating body such that the reciprocating body is allowed to reciprocate, wherein the reciprocating body comprises:

a valve element comprising a deflecting surface which causes a fluid to be deflected from the primary flow passage to the secondary flow passage in a state where the reciprocating body is in the open position, a valve shaft extending from the valve element, and guided by the guide cylinder so as to allow the reciprocating body to reciprocate, and a packing having an annular shape which is made of a material softer than the valve element, and which is circularly brought into close contact with the valve seat in a state where the reciprocating body is in the closed position, wherein the valve element further comprises a base portion disposed in the secondary flow passage, and an extending portion extending toward the primary flow passage from the base portion, wherein the base portion has a flange surface which supports the packing and contacts the valve seat at the secondary flow passage when the reciprocating body is in the closed position, wherein the flange surface is formed larger than the extending portion in a direction perpendicular to an axial direction of the valve shaft, and is formed such that the flange surface is allowed to come into contact with the valve seat via the packing, wherein on an outer periphery of the extending portion, a recess is formed which is recessed relative to other parts in the direction perpendicular to the axial direction of the valve shaft, and wherein a portion of the packing is fitted in the recess, wherein, at a part of the guide cylinder which accommodates the valve shaft, a through hole is formed which penetrates in a direction intersecting with the axial direction of the valve shaft.

2. The check valve according to claim 1, wherein
the packing is sandwiched between a surface of the base portion and a portion of the extending portion, and
the base portion and the extending portion are formed by assembling separate members.

3. The check valve according to claim 2, wherein a flange-side recessed portion is formed on the flange surface of the base portion,
in a direction perpendicular to the valve shaft, the flange-side recessed portion is formed with a size which allows the flange-side recessed portion to overlap with the valve seat, and
at least a portion of the packing is accommodated in the flange-side recessed portion.

4. The check valve according to claim 1, further comprising:
a valve box which has the valve seat and accommodates the reciprocating body;
a cap which has the guide cylinder and is mounted on the valve box; and a biasing member which is provided between the valve element and the cap to bias the valve element toward the primary flow passage, wherein
the guide cylinder has a standing wall which protrudes from a peripheral edge of the guide cylinder toward the valve element, and
the standing wall is formed at a position which separates, in the direction perpendicular to the axial direction of the valve shaft, an inlet of the guide cylinder, which accommodates the valve shaft, and the biasing member.

5. The check valve according to claim 2, wherein
the separate members are threadedly engaged with each other so that the packing is sandwiched between the separate members.

6. The check valve according to claim 5, further comprising a locking member which presses the base portion toward the extending portion from the other side, wherein
the base portion has a first insertion hole allowing insertion of the valve shaft,
the valve shaft has a threaded portion on an outer peripheral surface at a portion on the other side of the base portion, and
the locking member has a second insertion hole allowing insertion of the valve shaft, and has a threaded engagement portion, which is threadedly engaged with the threaded portion, on an inner peripheral surface of the second insertion hole.

7. The check valve according to claim 6, wherein the locking member comes into contact with the guide cylinder in a state where the reciprocating body is in a fully-open position.

8. The check valve according to claim 7, wherein
an accommodating recessed portion, which accommodates the locking member, is formed on the guide cylinder, and
the locking member comes into contact with an accommodation bottom surface of the accommodating recessed portion in a state where the reciprocating body is in a fully-open position.

9. The check valve according to claim 1, wherein in the valve shaft, a through hole is formed which penetrates in a direction perpendicular to a virtual plane including a deflection direction in the plane.

10. The check valve according to claim 1, wherein
at respective parts of the outer peripheral surface of the valve shaft and an inner peripheral surface of the guide cylinder which oppose each other in a state where the guide cylinder accommodates the valve shaft, planar portions extending in the axial direction of the valve shaft are respectively formed, and are arranged parallel to each other.

11. A lift type check valve comprising:
a valve seat;
a reciprocating body which is allowed to linearly reciprocate between a closed position, where the reciprocating body is brought into close contact with the valve seat, and an open position, where the reciprocating body is away from the valve seat;
a primary flow passage which is positioned on an upstream side of the reciprocating body;
a secondary flow passage which is positioned on a downstream side of the reciprocating body, and which intersects with the primary flow passage at the valve seat; and
a guide cylinder which guides the reciprocating body such that the reciprocating body is allowed to reciprocate, wherein the reciprocating body comprises:
a valve element comprising a deflecting surface which causes a fluid to be deflected from the primary flow passage to the secondary flow passage in a state where the reciprocating body is in the open position,
a valve shaft extending from the valve element, and guided by the guide cylinder so as to allow the reciprocating body to reciprocate, and
a packing having an annular shape which is made of a material softer than the valve element, and which is circularly brought into close contact with the valve seat in a state where the reciprocating body is in the closed position,
wherein the valve element further comprises a base portion disposed in the secondary flow passage, and an extending portion extending toward the primary flow passage from the base portion,
wherein the base portion has a flange surface which supports the packing and contacts the valve seat at the secondary flow passage when the reciprocating body is in the closed position,
wherein the flange surface is formed larger than the extending portion in a direction perpendicular to an axial direction of the valve shaft, and is formed such that the flange surface is allowed to come into contact with the valve seat via the packing,
wherein on an outer periphery of the extending portion, a recess is formed which is recessed relative to other parts in the direction perpendicular to the axial direction of the valve shaft,
wherein a portion of the packing is fitted in the recess,
wherein, in the valve shaft, a through hole is formed which penetrates in the direction intersecting with the axial direction of the valve shaft.

12. The check valve according to claim 11, wherein a first through hole is formed at the part of the guide cylinder which accommodates the valve shaft,
the through hole formed in the valve shaft is a second through hole, and
the first through hole and the second through hole are formed so as to at least partially overlap with each other in a state where a portion of the valve shaft is accommodated in the guide cylinder.

13. The check valve according to claim 12, wherein in a direction perpendicular to the axial direction, a width of the first through hole is larger than a width of the second through hole.

14. A lift type check valve comprising:
a valve seat;
a reciprocating body which is allowed to linearly reciprocate between a closed position, where the reciprocating body is brought into close contact with the valve seat, and an open position, where the reciprocating body is away from the valve seat;
a primary flow passage which is positioned on an upstream side of the reciprocating body;
a secondary flow passage which is positioned on a downstream side of the reciprocating body, and which intersects with the primary flow passage at the valve seat; and
a guide cylinder which guides the reciprocating body such that the reciprocating body is allowed to reciprocate, wherein
the reciprocating body comprises:
a valve element comprising a deflecting surface which causes a fluid to be deflected from the primary flow passage to the secondary flow passage in a state where the reciprocating body is in the open position,
a valve shaft extending from the valve element, and guided by the guide cylinder so as to allow the reciprocating body to reciprocate, and
a packing having an annular shape which is made of a material softer than the valve element, and which is circularly brought into close contact with the valve seat in a state where the reciprocating body is in the closed position,
wherein the valve element further comprises a base portion disposed in the secondary flow passage, and an extending portion extending toward the primary flow passage from the base portion,
wherein the base portion has a flange surface which supports the packing and contacts the valve seat at the secondary flow passage when the reciprocating body is in the closed position,
wherein the flange surface is formed larger than the extending portion in a direction perpendicular to an axial direction of the valve shaft, and is formed such that the flange surface is allowed to come into contact with the valve seat via the packing,
wherein on an outer periphery of the extending portion, a recess is formed which is recessed relative to other parts in the direction perpendicular to the axial direction of the valve shaft,
wherein a portion of the packing is fitted in the recess,
wherein the extending portion comprises a deflecting portion comprising the deflecting surface,
wherein at a part of the extending portion which is allowed to come into contact with the packing, a protrusion is formed which protrudes relative to surroundings in the direction intersecting with the axial direction of the valve shaft such that each of a first length of the protrusion in the direction intersecting with the axial direction of the valve shaft and a second length of the protrusion in the axial direction of the valve shaft is shorter than a third length of the deflecting portion in the axial direction.

15. The check valve according to claim 14, wherein the base portion and the extending portion are integrally formed by assembling separate members,
the extending portion has a hollow portion,
at a part of the extending portion which opposes the base portion, an opening communicating with the hollow portion is formed,
a maximum diameter of the hollow portion is formed larger than the opening in the direction perpendicular to the axial direction of the valve shaft, and
the extending portion including the hollow portion is formed mirror symmetrically with respect to a virtual plane including the deflection direction of the fluid and the axial direction of the valve shaft in the plane.

16. A lift type check valve comprising:
a valve seat;
a reciprocating body which is allowed to linearly reciprocate between a closed position, where the reciprocating body is brought into close contact with the valve seat, and an open position, where the reciprocating body is away from the valve seat;
a primary flow passage which is positioned on an upstream side of the reciprocating body;
a secondary flow passage which is positioned on a downstream side of the reciprocating body, and which intersects with the primary flow passage at the valve seat; and a guide cylinder which guides the reciprocating body such that the reciprocating body is allowed to reciprocate, a valve box which has the valve seat and accommodates the reciprocating body, wherein the reciprocating body comprises:

a valve element comprising a deflecting surface which causes a fluid to be deflected from the primary flow passage to the secondary flow passage in a state where the reciprocating body is in the open position, a valve shaft extending from the valve element, and guided by the guide cylinder so as to allow the reciprocating body to reciprocate, and a packing having an annular shape which is made of a material softer than the valve element, and which is circularly brought into close contact with the valve seat in a state where the reciprocating body is in the closed position, wherein the valve element further comprises a base portion disposed in the secondary flow passage, and an extending portion extending toward the primary flow passage from the base portion, wherein the base portion has a flange surface which supports the packing and contacts the valve seat at the secondary flow passage when the reciprocating body is in the closed position, wherein the flange surface is formed larger than the extending portion in a direction perpendicular to an axial direction of the valve shaft, and is formed such that the flange surface is allowed to come into contact with the valve seat via the packing, wherein on an outer periphery of the extending portion, a recess is formed which is recessed relative to other parts in the direction perpendicular to the axial direction of the valve shaft, wherein a portion of the packing is fitted in the recess, wherein the base portion has a peripheral edge portion which is formed to protrude more toward a distal end side of the valve shaft than other parts, and wherein the peripheral edge portion is formed along an inner wall of the valve box.

17. The check valve according to claim 16, wherein on a surface of the base portion on the other side, a the-other-side recessed portion which is recessed relative to the peripheral edge portion is formed, and a rib is formed on the the-other-side recessed portion.

18. A reciprocating body for a check valve, used in a lift type check valve which comprises:

a valve seat;

a reciprocating body which is allowed to linearly reciprocate between a closed position, where the reciprocating body is brought into close contact with the valve seat, and an open position, where the reciprocating body is away from the valve seat;

a primary flow passage which is positioned on an upstream side of the reciprocating body;

a secondary flow passage which is positioned on a downstream side of the reciprocating body, and which intersects with the primary flow passage at the valve seat; and a guide cylinder which guides the reciprocating body such that the reciprocating body is allowed to reciprocate, the reciprocating body comprising:

a valve element comprising a deflecting surface which causes a fluid to be deflected from the primary flow passage to the secondary flow passage in a state where the reciprocating body is in the open position;

a valve shaft extending from the valve element, and guided by the guide cylinder so as to allow the reciprocating body to reciprocate; and a packing having an annular shape which is made of a material softer than the valve element, and which is circularly brought into close contact with the valve seat in a state where the reciprocating body is in the closed position, wherein the valve element further comprises a base portion disposed in the secondary flow passage, and an extending portion extending toward the primary flow passage from the base portion, wherein the base portion has a flange surface which supports the packing in a state where the packing is exposed to the primary flow passage, wherein the flange surface is formed larger than the extending portion in a direction perpendicular to an axial direction of the valve shaft, and is formed such that at least a portion of the flange surface is allowed to come into contact with the valve seat via the packing, wherein on an outer periphery of the extending portion, a recess is formed which is recessed relative to other parts in the direction perpendicular to the axial direction of the valve shaft, and wherein a portion of the packing is fitted in the recess, wherein, in the valve shaft, a through hole is formed which penetrates in the direction intersecting with the axial direction of the valve shaft.

* * * * *